(12) United States Patent
Moriyama

(10) Patent No.: US 12,353,344 B2
(45) Date of Patent: Jul. 8, 2025

(54) COMMUNICATION APPARATUS AND COMMUNICATION METHOD

(71) Applicant: SONY SEMICONDUCTOR SOLUTIONS CORPORATION, Kanagawa (JP)

(72) Inventor: Taketoshi Moriyama, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 90 days.

(21) Appl. No.: 18/254,949

(22) PCT Filed: Nov. 25, 2021

(86) PCT No.: PCT/JP2021/043097
§ 371 (c)(1),
(2) Date: May 30, 2023

(87) PCT Pub. No.: WO2022/124083
PCT Pub. Date: Jun. 16, 2022

(65) Prior Publication Data
US 2024/0045818 A1 Feb. 8, 2024

(30) Foreign Application Priority Data
Dec. 9, 2020 (JP) ................. 2020-204159

(51) Int. Cl.
*G06F 13/36* (2006.01)
*G06F 13/364* (2006.01)
*G06F 13/42* (2006.01)

(52) U.S. Cl.
CPC ........ G06F 13/364 (2013.01); G06F 13/4291 (2013.01)

(58) Field of Classification Search
CPC ............................. G06F 13/364; G06F 13/4291
See application file for complete search history.

(56) References Cited

U.S. PATENT DOCUMENTS 11,356,314 B2 * 6/2022 Mishra ................. H04L 1/0063
11,544,132 B2 * 1/2023 Takahashi .......... G06F 13/4282
(Continued)

FOREIGN PATENT DOCUMENTS

JP 2015-230672 A 12/2015
JP 2017-010105 A 1/2017
(Continued)

OTHER PUBLICATIONS

International Search Report and Written Opinion of PCT Application No. PCT/JP2021/043097, issued on Feb. 15, 2022, 08 pages of ISRWO.

Primary Examiner — Henry Tsai
Assistant Examiner — Christopher A Daley
(74) Attorney, Agent, or Firm — CHIP LAW GROUP

(57) ABSTRACT

The present disclosure relates to a communication apparatus, a communication method, and a program capable of improving transfer efficiency of data transfer.

An I3C master transmits an access request which requests writing of data to an I3C slave, determines whether or not a write completion status in response to the access request is transmitted from the I3C slave by an interrupt request in a case where the response of the I3C slave to the access request is a NACK response, and stands by for a process until the write completion status is transmitted by the interrupt request. The I3C slave receives the access request transmitted from the I3C master, transmits a NACK response to the I3C master in a case where writing of data in response to the access request is not completed, and transmits a write completion status by an interrupt request at a timing when the writing of the data in the response to the access request has been completed. The present technology (Continued)

can be applied to, for example, a communication system that performs communication in accordance with the I3C standard.

11 Claims, 21 Drawing Sheets

(56) References Cited

U.S. PATENT DOCUMENTS

2018/0181531 A1\* 6/2018 Foust .................. G06F 13/36
2019/0238362 A1\* 8/2019 Mishra .............. H04L 12/40032

FOREIGN PATENT DOCUMENTS

JP         2017-510006  A    4/2017
WO        2017/056917  A1    4/2017

\* cited by examiner

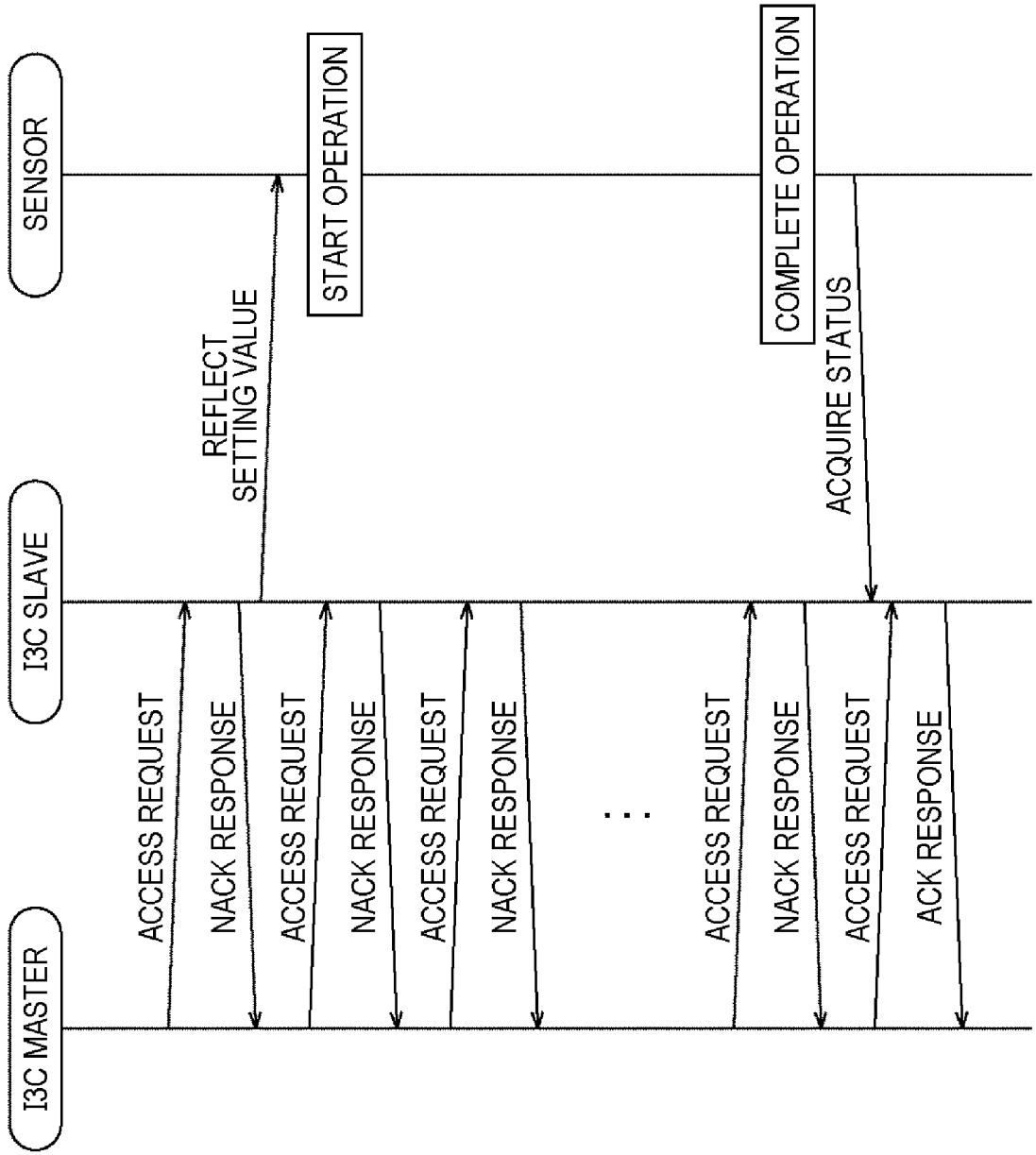

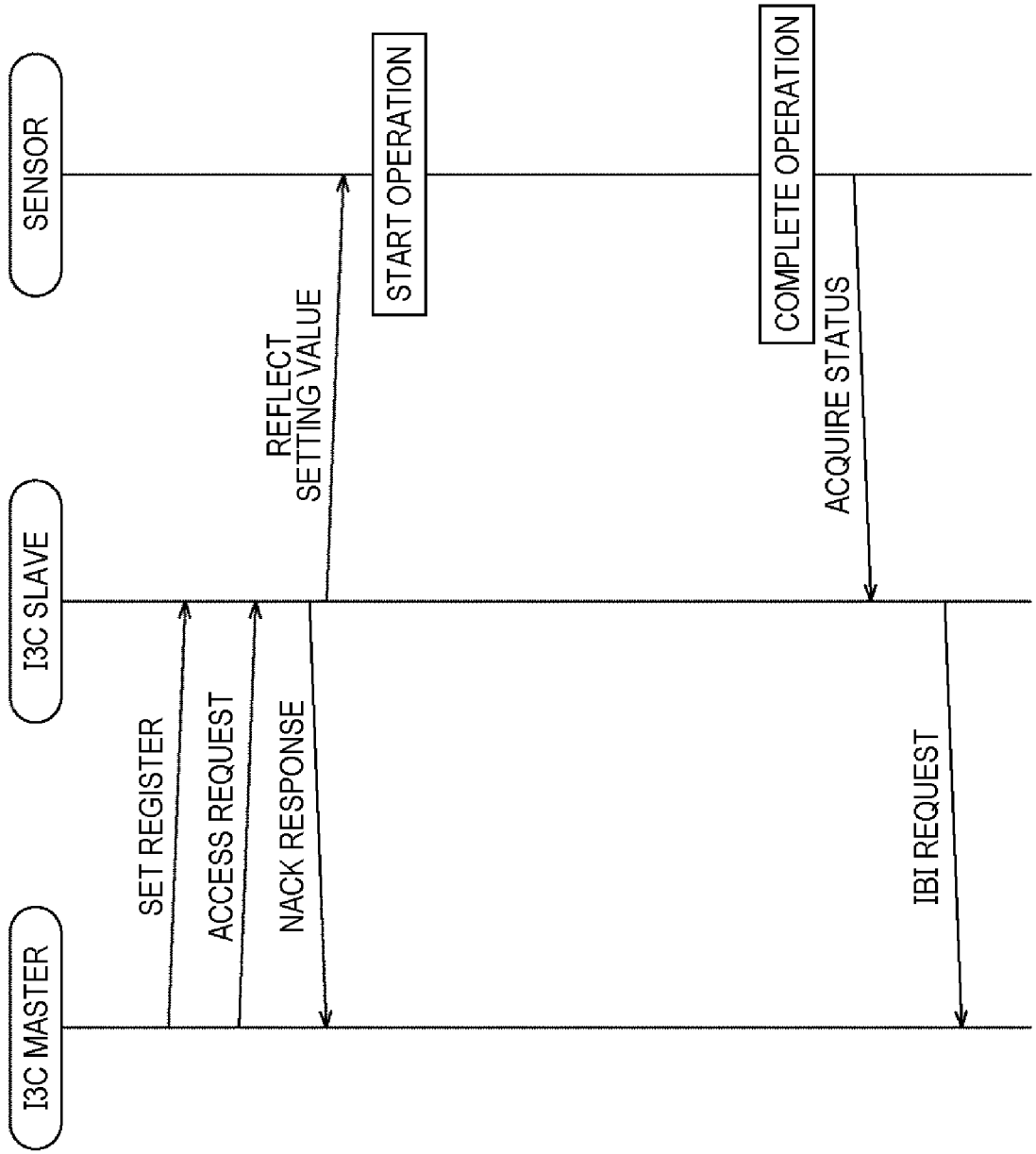

COMMUNICATION APPARATUS AND COMMUNICATION METHOD

CROSS REFERENCE TO RELATED APPLICATIONS

This application is a U.S. National Phase of International Patent Application No. PCT/JP2021/043097 filed on Nov. 25, 2021, which claims priority benefit of Japanese Patent Application No. JP 2020-204159 filed in the Japan Patent Office on Dec. 9, 2020. Each of the above-referenced applications is hereby incorporated herein by reference in its entirety.

TECHNICAL FIELD

The present disclosure relates to a communication apparatus, a communication method, and a program, and more particularly, to a communication apparatus, a communication method, and a program capable of improving transfer efficiency of data transfer.

BACKGROUND ART

Conventionally, an inter-integrated circuit (I2C) standard has been widely adopted as a bus interface (IF) for controlling registers in various devices. In recent years, it has been required to realize high-speed and multi-functionalized I2C, and a definition of an improved inter integrated circuit (I3C) has been formulated by a mobile industry processor interface (MIPI) alliance as a next-generation standard, and the revision thereof is in progress.

For example, I2C and I3C are configured to be able to communicate with a slave connected to the bus IF according to control by the master having the initiative of communication via the bus IF. Furthermore, the I3C has an in band interrupts (IBI) function that enables a slave connected to the bus IF to make an interrupt request.

For example, Patent Document 1 discloses a technology related to camera interface extension using an in-band interrupt that asserts an interrupt request from a slave device.

CITATION LIST

Patent Document

Patent Document 1: Japanese Translation of PCT International Application Publication No. 2017-510006

SUMMARY OF THE INVENTION

Problems to be Solved by the Invention

Incidentally, in the configuration of the conventional I3C bus, for example, in response to a NACK response from the I3C slave to a write access request, the I3C master needs to repeatedly make a write access request until write data is reflected, that is, until there is an ACK response from the I3C slave. Such repetition of the write access request reduces the transfer efficiency of data transfer, and there is a demand for improvement.

Moreover, for example, in a configuration in which a plurality of I3C slaves is connected to the same I3C bus, in a case where a write access request is repeatedly made, the I3C bus is occupied by an I3C slave having a large write latency, and the band in which the other I3C slaves communicate is limited.

The present disclosure has been made in view of such a situation, and enables improvement in transfer efficiency of data transfer.

Solutions to Problems

A communication apparatus according to a first aspect of the present disclosure includes: an access request transmission unit that transmits an access request which requests writing of data to another communication apparatus via a bus; and a process standby determination unit that determines whether or not a write completion status indicating that the writing of the data has been completed in response to the access request is transmitted from the another communication apparatus by an interrupt request in a case where a response of the another communication apparatus to the access request is a NACK response, and stands by for a process until the write completion status is transmitted by the interrupt request.

A communication method or a program according to the first aspect of the present disclosure includes: transmitting an access request which requests writing of data to another communication apparatus via a bus; and determining whether or not a write completion status indicating that the writing of the data has been completed in response to the access request is transmitted from the another communication apparatus by an interrupt request in a case where a response of the another communication apparatus to the access request is a NACK response, and standing by for a process until the write completion status is transmitted by the interrupt request.

In the first aspect of the present disclosure, an access request which requests writing of data to another communication apparatus is transmitted via a bus, it is determined whether or not a write completion status indicating that the writing of the data has been completed in response to the access request is transmitted from the another communication apparatus by an interrupt request in a case where a response of the another communication apparatus to the access request is a NACK response, and a process is stood by for until the write completion status is transmitted by the interrupt request.

A communication apparatus according to a second aspect of the present disclosure includes: an access request reception unit that receives an access request which requests writing of data, the access request being transmitted from another communication apparatus via a bus; and a transmission unit that transmits a NACK response to the another communication apparatus in a case where the writing of the data in response to the access request has not been completed, and transmits a write completion status indicating that the writing of the data has been completed by an interrupt request at a timing when the writing of the data in response to the access request has been completed.

A communication method or a program according to the second aspect of the present disclosure includes: receiving an access request which requests writing of data, the access request being transmitted from another communication apparatus via a bus; and transmitting a NACK response to the another communication apparatus in a case where the writing of the data in response to the access request has not been completed, and transmitting a write completion status indicating that the writing of the data has been completed by an interrupt request at a timing when the writing of the data in response to the access request has been completed.

In the second aspect of the present disclosure, an access request which requests writing of data is received, the access request being transmitted from another communication apparatus via a bus, a NACK response is transmitted to the another communication apparatus in a case where the writing of the data in response to the access request has not been completed, and a write completion status indicating that the writing of the data has been completed is transmitted by an interrupt request at a timing when the writing of the data in response to the access request has been completed.

BRIEF DESCRIPTION OF DRAWINGS

FIG. 2 is a diagram illustrating a process example of making a write access by a conventional communication method.

FIG. 3 is a diagram illustrating a process example of making a write access by a communication method to which the present technology is applied.

MODE FOR CARRYING OUT THE INVENTION

Hereinafter, specific embodiments to which the present technology is applied will be described in detail with reference to the drawings.

<Configuration Example of Communication System>

Figure 1A:
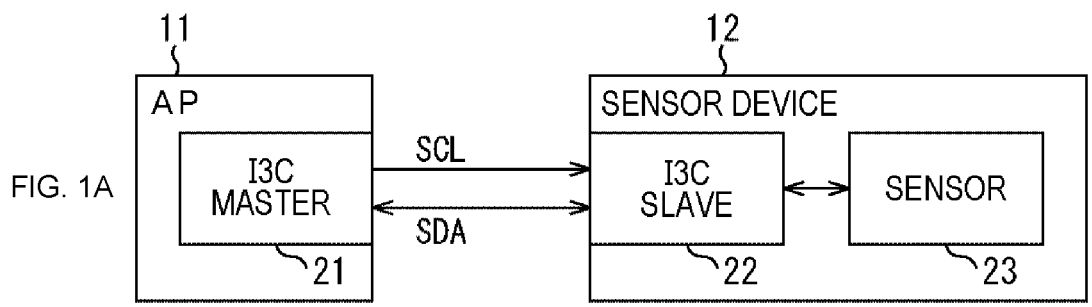
FIGS. 1A and 1B are block diagrams illustrating a configuration example of an embodiment of a communication system to which the present technology is applied.
Figure 1B:
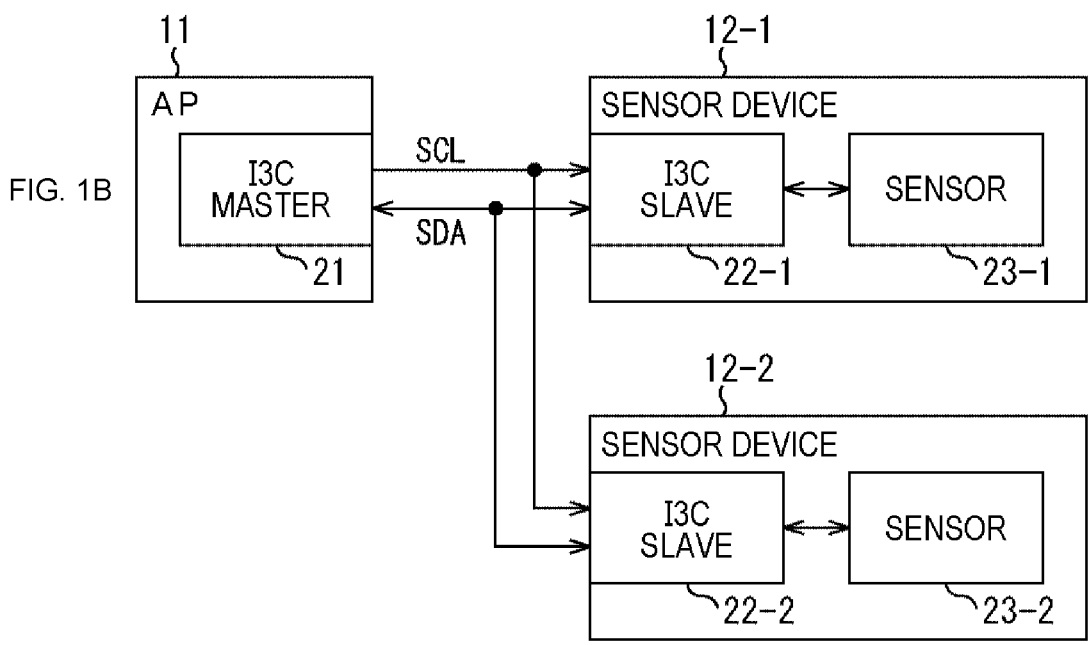

FIGS. 1A and 1B are block diagrams illustrating a configuration example of an embodiment of a communication system to which the present technology is applied.

In the communication system illustrated in FIGS. 1A and 1B, an application processor 11 and a sensor device 12 are connected via an I3C bus including two signal lines, that is, a signal line for sending serial data SDA and a signal line for sending a serial clock SCL, and perform communication in accordance with the I3C standard. For example, the application processor 11 includes an I3C master 21 and the sensor device 12 includes an I3C slave 22 and a sensor 23.

FIG. 1A illustrates a communication system of a configuration example in which the one I3C slave 22 is connected to the one I3C master 21. FIG. 1B illustrates a communication system of a configuration example in which two I3C slaves 22-1 and 22-2 are connected to the one I3C master 21.

The I3C master 21 has the initiative of communication in the I3C bus, and for example, makes an access request such as a write request to the I3C slave 22 to control communication with the I3C slave 22.

The I3C slave 22 can perform communication via the I3C bus depending on control of communication by the I3C master 21. Note that the I3C slaves 22-1 and 22-2 have similar configurations.

As the sensor 23, for example, various sensors such as an image sensor and a gyro sensor can be used, and data obtained as a sensing result can be supplied to the I3C slave 22 at a predetermined sampling period or in response to a request from the I3C slave 22.

In the communication system having such a configuration, the I3C master 21 and the I3C slave 22 can communicate by a communication method to which the present technology as described below is applied.

That is, the I3C master 21 transmits an access request which requests writing of data to the I3C slave 22 via the I3C bus, determines whether or not a write completion status indicating that the writing of the data is completed in response to the access request is transmitted from the I3C slave 22 by an interrupt request in a case where the response of the I3C slave 22 to the access request is a NACK response. Then, the I3C master 21 stands by for a process until the data is transmitted by the interrupt request. If the I3C master 21 receives the write completion status, the I3C master 21 can recognize that reflection of the data requested to be written is completed.

Furthermore, the I3C slave 22 receives an access request which requests writing of data, the access request being transmitted from the I3C master 21 via the I3C bus, and transmits a NACK response to the I3C master 21 in a case where the writing of data in response to the access request is not completed. Then, the I3C slave 22 transmits a write completion status indicating that the writing of the data is completed by the interrupt request at a timing when the writing of the data in response to the access request is completed.

With reference to FIGS. 2 and 3, a process example of making a write access in which transmission of an access request and transmission of a write completion status in response to the access request are separated will be described by comparing a conventional communication method with a communication method to which the present technology is applied. Here, a communication method in the communication system having a configuration in which the one I3C slave 22 is connected to the one I3C master 21 as illustrated in FIG. 1A will be described.

As illustrated in FIG. 2, in the conventional communication method, when the I3C master 21 makes an access request which requests reflection of write data, the I3C slave 22 transmits a NACK response to the I3C master 21 and requests the sensor 23 to reflect the write data (for example, a setting value) in a case where the reflection of the write data is not completed. In response to this, the sensor 23 starts an operation of writing the write data.

In contrast, the I3C master 21 repeats the access request until there is an ACK response from the I3C slave 22, and the I3C slave 22 repeatedly transmits a NACK response in response to the access request. Thereafter, when the sensor 23 completes the reflection of the write data, the I3C slave 22 transmits an ACK response in response to the access request after the write completion status indicating that the reflection of the write data is completed is acquired from the sensor 23.

As described above, in the conventional communication method, the I3C master 21 needs to repeatedly make an access request in the period from transmission of the first NACK response to transmission of an ACK response. For this reason, conventionally, not only the bus is occupied, but also the I3C bus band is taken up and power is wasted.

In contrast, as illustrated in FIG. 3, in the communication method to which the present technology is applied, the I3C master 21 configures register settings for the I3C slave 22 and sets the mode for transferring the write completion status by IBI to be enabled. Thereafter, when the I3C master 21 makes an access request which requests reflection of write data, the I3C slave 22 transmits a NACK response to the I3C master 21 in a case where reflection of the write data is not completed. In response to this, the I3C master 21 stands by for a process until an IBI request is made by the I3C slave 22 or a predetermined IBI reception waiting time elapses.

Then, in response to the I3C slave 22 requesting the sensor 23 to reflect the write data (for example, the setting value), the sensor 23 starts an operation of writing the write data. Thereafter, when the sensor 23 completes the operation of writing the write data, the I3C slave 22 acquires a write completion status from the sensor 23, makes an IBI request to the I3C master 21, and transmits data including the write completion status in the payload.

As described above, in the communication method to which the present technology is applied, since the I3C slave 22 can transmit the write completion status by IBI, it is avoided that the bus is occupied in the period from transmission of the first NACK response to transmission of an ACK response as in the conventional communication method. For example, in this period, since the I3C master 21 can execute another access, the transfer efficiency of data transfer can be improved. Moreover, not only the bus band can be effectively used, but also unnecessary repetition of access requests can be avoided. As a result, power consumption can be reduced.

A process example of continuously making write accesses to two types of addresses will be described with reference to FIGS. 4 to 6. Here, as illustrated in FIG. 1B, a communication method in the communication system having the configuration in which the two devices, that is, the I3C slave 22-1 (Address1 is assigned) and the I3C slave 22-2 (Address2 is assigned) are connected to the one I3C master 21 will be described. Furthermore, as a precondition of the process example described with reference to FIGS. 4 to 6, it is assumed that the I3C slaves 22-1 and 22-2 can complete reflection of write data at a timing after two access requests are made in response to a write request from the I3C master 21.

Figure 4:
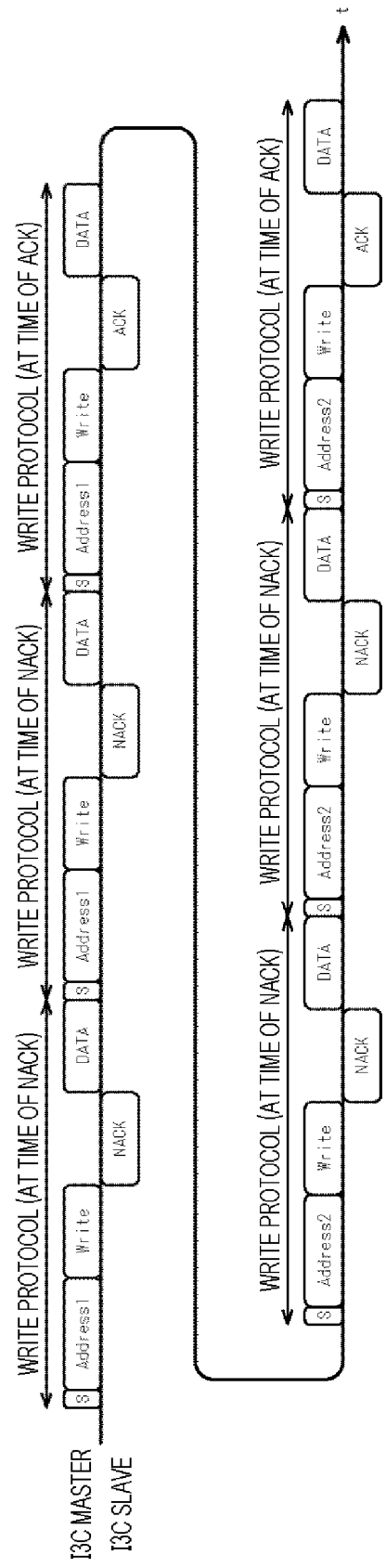
FIG. 4 is a diagram illustrating a process example of continuously performing a write access to two types of addresses by the conventional communication method.

As illustrated in FIG. 4, in the conventional communication method, the I3C master 21 makes a first write request to the I3C slave 22-1 and receives a NACK response, and makes a second write request to the I3C slave 22-1 and receives a NACK response. Thereafter, transmission of an ACK response from the I3C slave 22-1 in response to a third write request to the I3C slave 22-1 enables the I3C master 21 to recognize that reflection of write data is completed. Note that in accordance with the write protocol, the I3C master 21 transmits the write data even after receiving the ACK response.

Subsequently, the I3C master 21 makes a first write request to the I3C slave 22-2 and receives a NACK response, and makes a second write request to the I3C slave 22-2 and receives a NACK response. Thereafter, transmission of an ACK response from the I3C slave 22-2 in response to a third write request to the I3C slave 22-2 enables the I3C master 21 to recognize that reflection of write data is completed. Note that in accordance with the write protocol, the I3C master 21 transmits the write data even after receiving the ACK response.

As described above, in the I3C slaves 22-1 and 22-2, in a case where reflection of write data can be completed at the timing after two access requests are made, in the conventional communication method, six accesses are required until an ACK response is received after reflection of the write data is completed in each of the I3C slaves 22-1 and 22-2.

Figure 5:
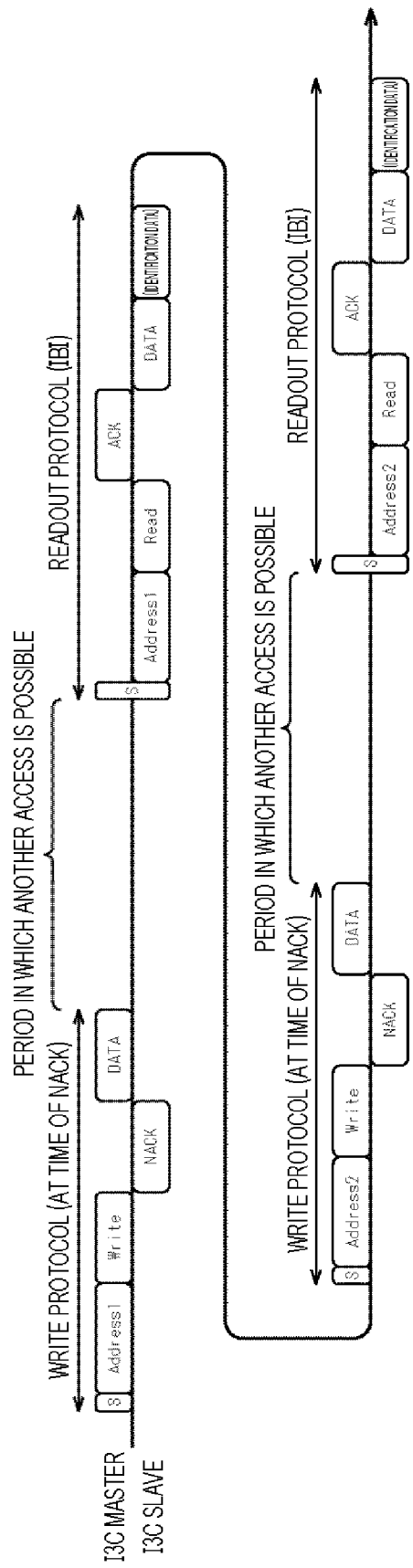
FIG. 5 is a diagram illustrating a process example of continuously making write accesses to two types of addresses by the communication method to which the present technology is applied.

In contrast, as illustrated in FIG. 5, in the communication method to which the present technology is applied, when the I3C master 21 makes a write request to the I3C slave 22-1 and receives a NACK response, the I3C master 21 stands by for a process after transmitting write data. Thereafter, a period until the I3C slave 22-1 makes an IBI request becomes a period in which another access can be made, and the I3C slave 22-1 makes an IBI request to the I3C master 21 and transmits a write completion status (DATA) at the timing when reflection of the write data is completed. At this time, the I3C slave 22-1 can add identification data for identifying the write request corresponding to the write completion status transmitted in the IBI request to the write completion status and transmit the identification data and the write completion status.

Subsequently, when the I3C master 21 makes a write request to the I3C slave 22-2 and receives a NACK response, the I3C master 21 stands by for a process after transmitting write data. Thereafter, a period until the I3C slave 22-2 makes an IBI request becomes a period in which another access can be made, and the I3C slave 22-1 makes an IBI request to the I3C master 21 and transmits a write completion status (DATA) at the timing when reflection of the write data is completed. At this time, the I3C slave 22-2 can add identification data for identifying the write request corresponding to the write completion status transmitted in the IBI request to the write completion status and transmit the identification data and the write completion status.

As described above, in the communication method to which the present technology is applied, it is only necessary to make four accesses until write data is reflected in each of the I3C slaves 22-1 and 22-2 and the write completion status is received. That is, as described with reference to FIG. 4, since the conventional communication method requires six accesses, the number of accesses can be reduced to ⅔ by adopting the communication method to which the present technology is applied. As described above, the transfer efficiency of data transfer can be improved, and power consumption can also be reduced to ⅔.

Furthermore, in FIG. 6, another process example of continuously performing write accesses to the two types of addresses by the communication method to which the present technology is applied, for example, a process example utilizing the period in which another access can be made as illustrated in FIG. 5 will be described.

Figure 6:
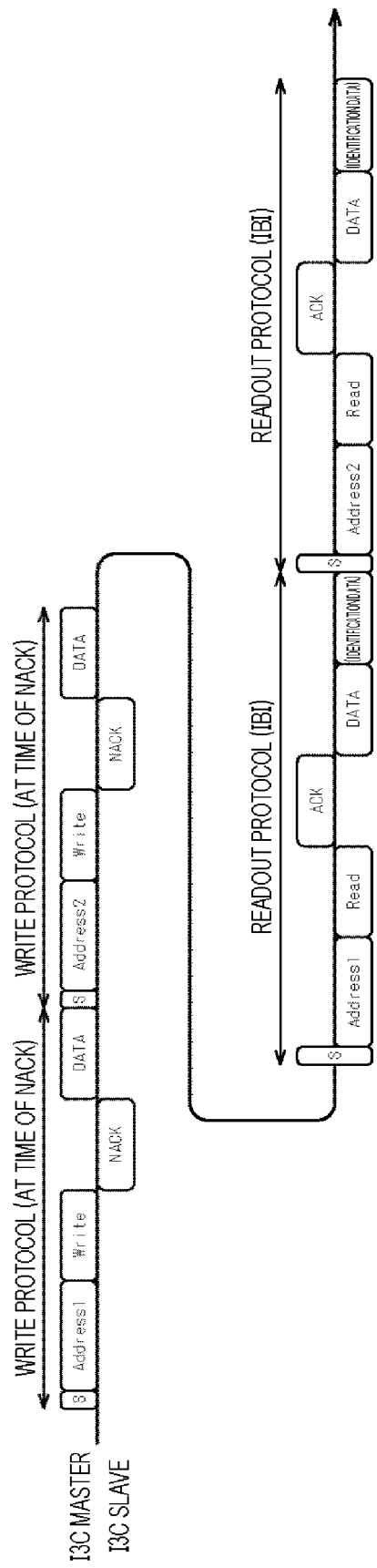
FIG. 6 is a diagram illustrating another process example of continuously making write accesses to the two types of addresses by the communication method to which the present technology is applied.

That is, as illustrated in FIG. 6, the I3C master 21 can make a write request to the I3C slave 22-2 in a period in which another access can be made, the period accompanying making a write request to the I3C slave 22-1 and receiving a NACK response. Then, each of the I3C slaves 22-1 and 22-2 makes an IBI request to the I3C master 21 and transmits the write completion status (DATA) and the identification data at the timing when reflection of the write data is completed.

As described above, by utilizing the period in which another access can be made, the communication band can be shared by the I3C slaves 22-1 and 22-2, and the transfer efficiency of data transfer can be further improved.

An example of the process example of setting a mode for transferring a write completion status by IBI to be enabled or disabled will be described with reference to FIG. 7. Furthermore, as a precondition of the process example described with reference to FIG. 7, it is assumed that in a case where the I3C slave 22 makes a NACK response to a write request, the I3C master 21 can set a mode for transferring a write completion status by IBI to be enabled or disabled by register setting.

Figure 7:
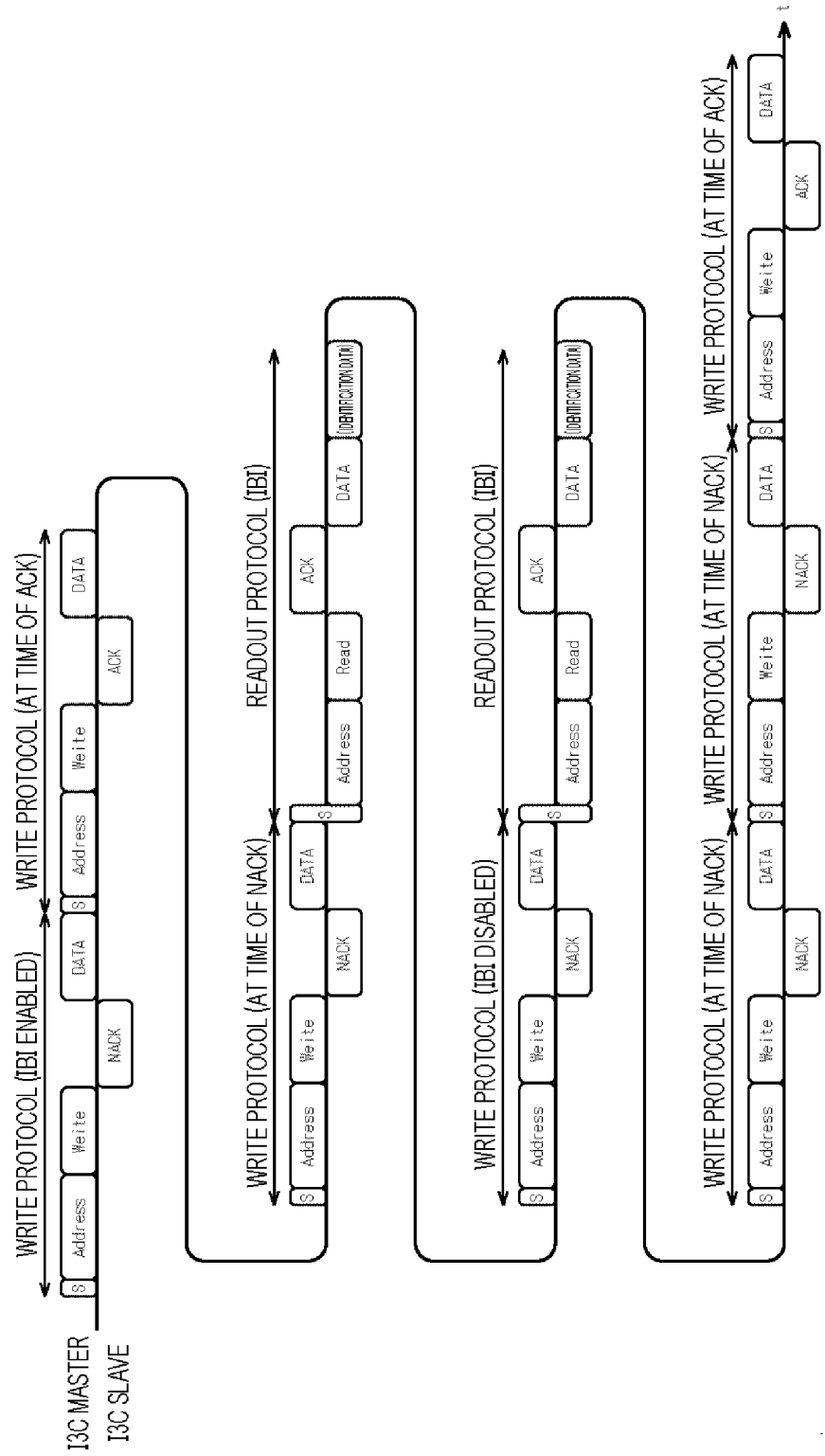
FIG. 7 is a diagram illustrating a process example of setting a mode for transferring a write completion status by IBI to be enabled or disabled.

As illustrated in FIG. 7, the I3C master 21 accesses the register of the I3C slave 22 according to a write protocol to set the mode for transferring the write completion status by IBI to be enabled. Subsequently, when the I3C master 21 makes a write request to the I3C slave 22 and receives an ACK response, the I3C master 21 recognizes that the mode for transferring the write completion status by IBI is set to be enabled. Then, when the I3C master 21 makes a write request to the I3C slave 22 and receives a NACK response, the I3C master 21 stands by for a process after transmitting write data. Thereafter, since the mode for transferring the write completion status by IBI is set to be enabled, the I3C slave 22 makes an IBI request to the I3C master 21 at the timing when reflection of the write data is completed, and transmits the write completion status and identification data.

Furthermore, the I3C master 21 accesses the register of the I3C slave 22 according to the write protocol to set the mode for transferring the write completion status by IBI to be disabled. In response to this, the I3C slave 22 makes an IBI request to the I3C master 21 at the timing when the mode for transferring the write completion status by IBI has been set to be disabled, and transmits the write completion status and the identification data. Then, the I3C master 21 repeats the write request to the I3C slave 22 (twice in the example illustrated in FIG. 7) until an ACK response is transmitted from the I3C slave 22. Thereafter, since the mode for transferring the write completion status by IBI is disabled, the I3C slave 22 makes an ACK response in response to the write request from the I3C master 21 at a timing when reflection of the write data is completed. As a result, the I3C master 21 can recognize that reflection of the write data is completed.

As described above, the I3C master 21 can set the mode for transferring the write completion status by IBI to be enabled or disabled by accessing the register of the I3C slave 22.

A process example of suspending an IBI reception waiting state of the I3C master 21 will be described with reference to FIGS. 8 and 9. Furthermore, as a precondition of the process example described with reference to FIGS. 8 and 9, it is assumed that the I3C master 21 can receive the write completion status by IBI reception from the I3C slave 22 in the case of making a write request to the I3C slave 22 and receiving a NACK response.

Figure 8:
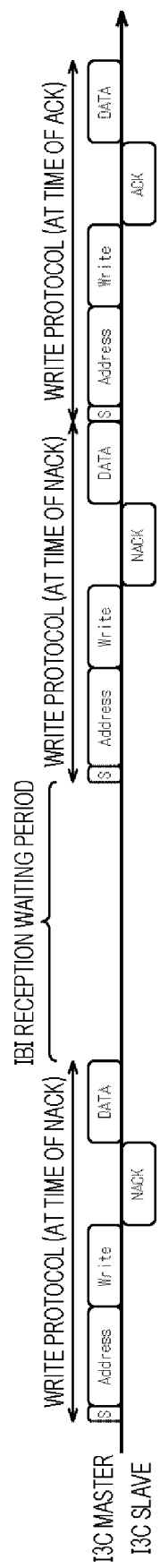
FIG. 8 is a diagram illustrating a process example in which an IBI reception waiting state of an I3C master is suspended due to the I3C master.

FIG. 8 illustrates a case of suspension due to the I3C master 21.

The I3C master 21 transmits write data in response to receiving a NACK response by making a write request to the I3C slave 22, and then stands by for a process and enters an IBI reception waiting state. Then, when a timeout occurs on the I3C master 21 side during the period of the IBI reception waiting state, the I3C master 21 makes a write request to the I3C slave 22 again.

At this time, the I3C slave 22 makes a NACK response in a case where reflection of the write data is not completed, and makes an ACK response in a case where reflection of the write data is completed. Note that it is also possible to transition to the IBI reception waiting state again.

Figure 9:
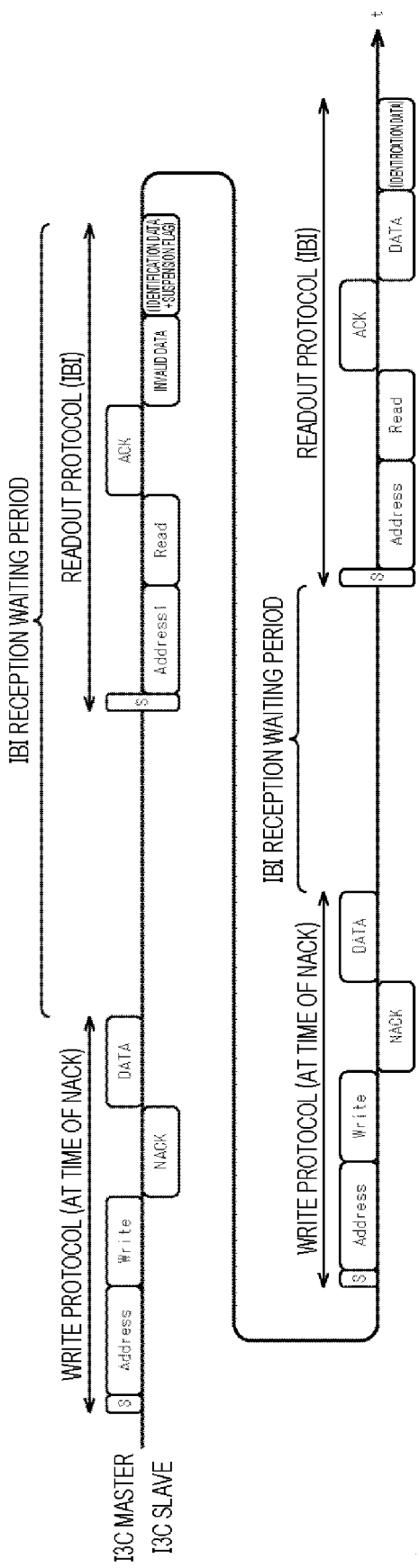
FIG. 9 is a diagram illustrating a process example in which the IBI reception waiting state of the I3C master is suspended due to an I3C slave.

FIG. 9 illustrates a case of suspension due to the I3C slave 22.

The I3C master 21 transmits write data in response to receiving a NACK response by making a write request to the I3C slave 22, and then stands by for a process and enters an IBI reception waiting state. Then, during the period of the IBI reception waiting state, the I3C slave 22 can suspend the IBI reception waiting state of the I3C master 21 by transmitting identification data and a suspension flag (flag giving an instruction on suspension of a process standby state) together with invalid data by IBI.

Note that, thereafter, the I3C master 21 can enter the IBI reception waiting state by standing by for a process after transmitting the write data in response to receiving a NACK response by making a write request to the I3C slave 22 again.

As described above, the IBI reception waiting state of the I3C master 21 can be suspended from either the I3C master 21 side or the I3C slave 22 side.

<Application to Other than I3C Standard>

Note that the present technology can be applied to a communication standard other than the I3C standard, for example, a communication standard in which devices share a bus communication signal, a handshake of an access request and a response is performed, and an access can be started from all the devices.

Figure 10:
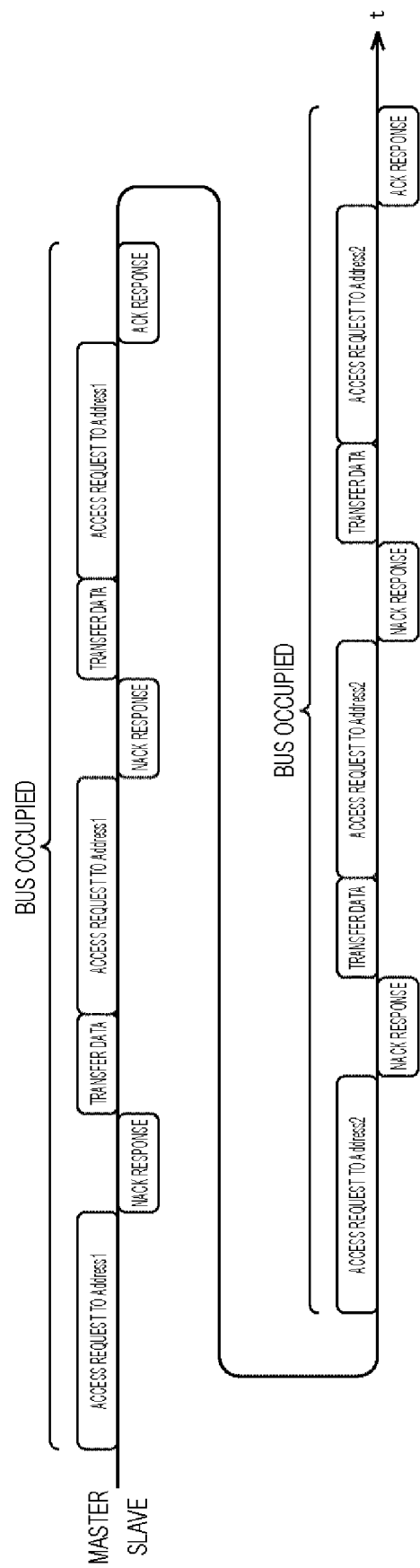
FIG. 10 is a diagram illustrating a process example of performing communication according to a communication standard other than the I3C standard by the conventional communication method.
Figure 11:
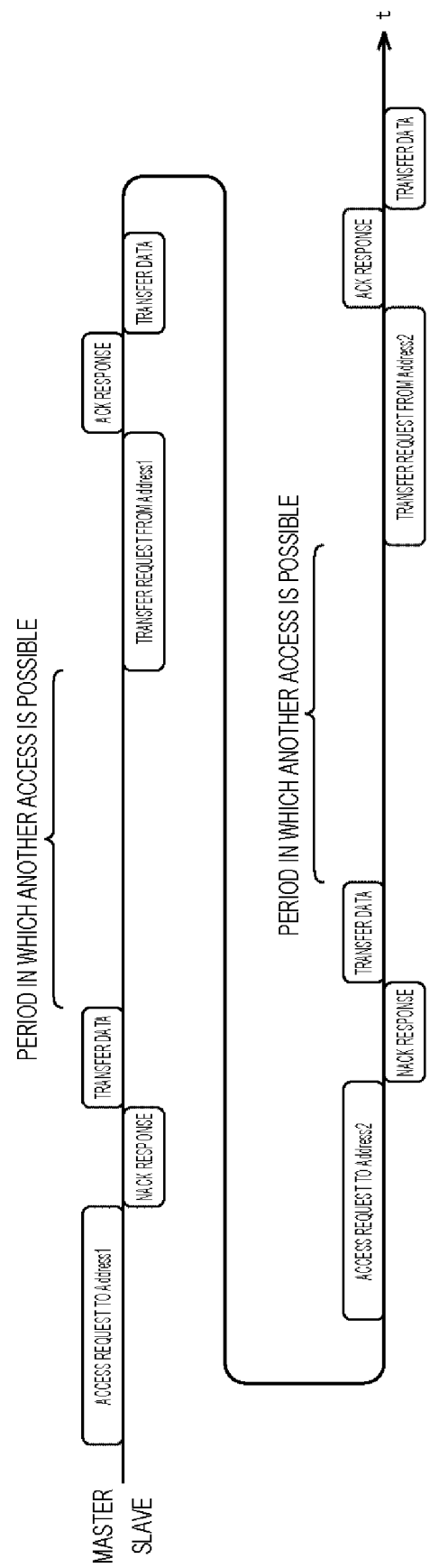
FIG. 11 is a diagram illustrating a process example of performing communication according to a communication standard other than the I3C standard by the communication method to which the present technology is applied.
Figure 12:
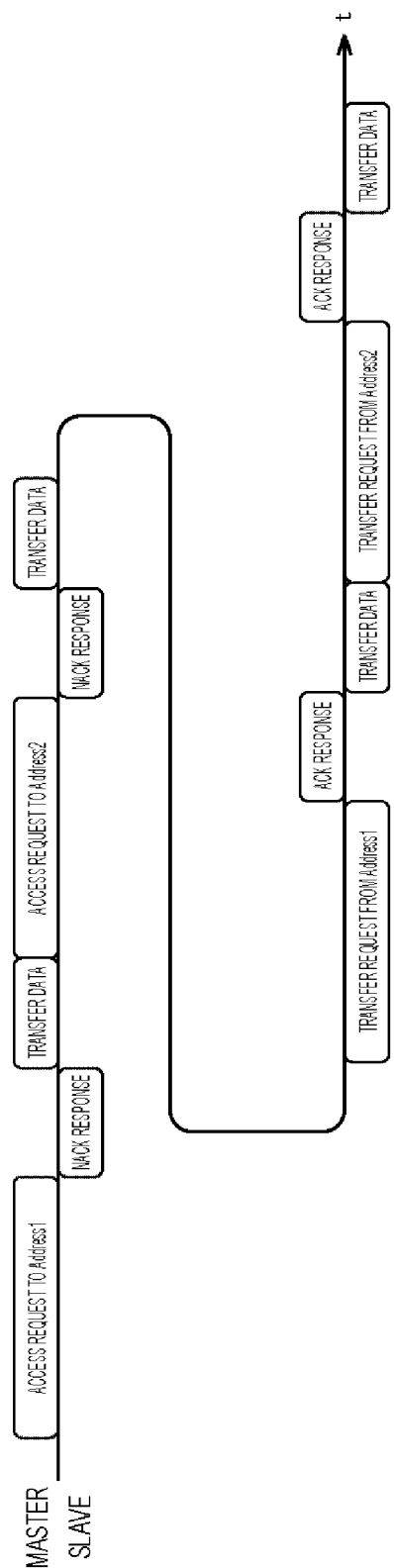
FIG. 12 is a diagram illustrating another process example of performing communication according to a communication standard other than the I3C standard by the communication method to which the present technology is applied.

With reference to FIGS. 10 to 12, a process example in a communication method of continuously performing write accesses to the two types of addresses will be described similarly to FIGS. 4 to 6 described above.

As illustrated in FIG. 10, in the conventional communication method, the master device repeatedly performs the process of transmitting transfer data after receiving a NACK response to an access request to the slave device (Address1) until an ACK response is transmitted. Then, when the master device receives an ACK response from the slave device (Address1), the master device recognizes that reflection of the transfer data is completed in the slave device (Address1).

Subsequently, the master device repeatedly performs the process of transmitting the transfer data after receiving a NACK response to an access request to the slave device (Address2) until an ACK response is transmitted. Then, when the master device receives an ACK response from the slave device (Address2), the master device recognizes that reflection of the transfer data is completed in the slave device (Address2).

As described above, in the conventional communication method, the bus is occupied until an access request is repeatedly made and reflection of transfer data is completed.

In contrast, as illustrated in FIG. 11, in the communication method to which the present technology is applied, when the master device makes an access request to the slave device (Address1) and receives a NACK response, the master device transmits transfer data and then stands by for a process. Thereafter, a period until the slave device (Address1) makes a transfer request becomes a period in which another access can be made. The slave device (Address1) makes a transfer request to the master device at a timing when reflection of the transfer data is completed, and transmits the transfer data, which is a write completion status.

Subsequently, when the master device makes an access request to the slave device (Address2) and receives a NACK response, the master device transmits transfer data and then stands by for a process. Thereafter, in a period until the slave device (Address2) makes a transfer request, another access can be made. The slave device (Address2) makes a transfer request to the master device at a timing when reflection of the transfer data is completed, and transmits the transfer data, which is a write completion status.

As described above, in the communication method to which the present technology is applied, another access can be made in the period from a NACK response to a transfer request.

Furthermore, in FIG. 12, a process example utilizing the period in which another access can be made illustrated in FIG. 11 will be described.

That is, as illustrated in FIG. 12, the master device can make an access request to the slave device (Address2) in the period in which another access can be made, the period accompanying making a transfer request to the slave device (Address1) and receiving a NACK response. Then, each of the slave device (Address1) and the slave device (Address2) makes a transfer request to the master device at a timing when reflection of the transfer data is completed, and transmits the transfer data, which is a write completion status.

As described above, by utilizing the period in which another access can be made, the communication band can be shared by the slave device (Address1) and the slave device (Address2), and the transfer efficiency of data transfer can be further improved.

<Communication Process>

A communication process will be described with reference to FIGS. 13 to 18.

Figure 13:
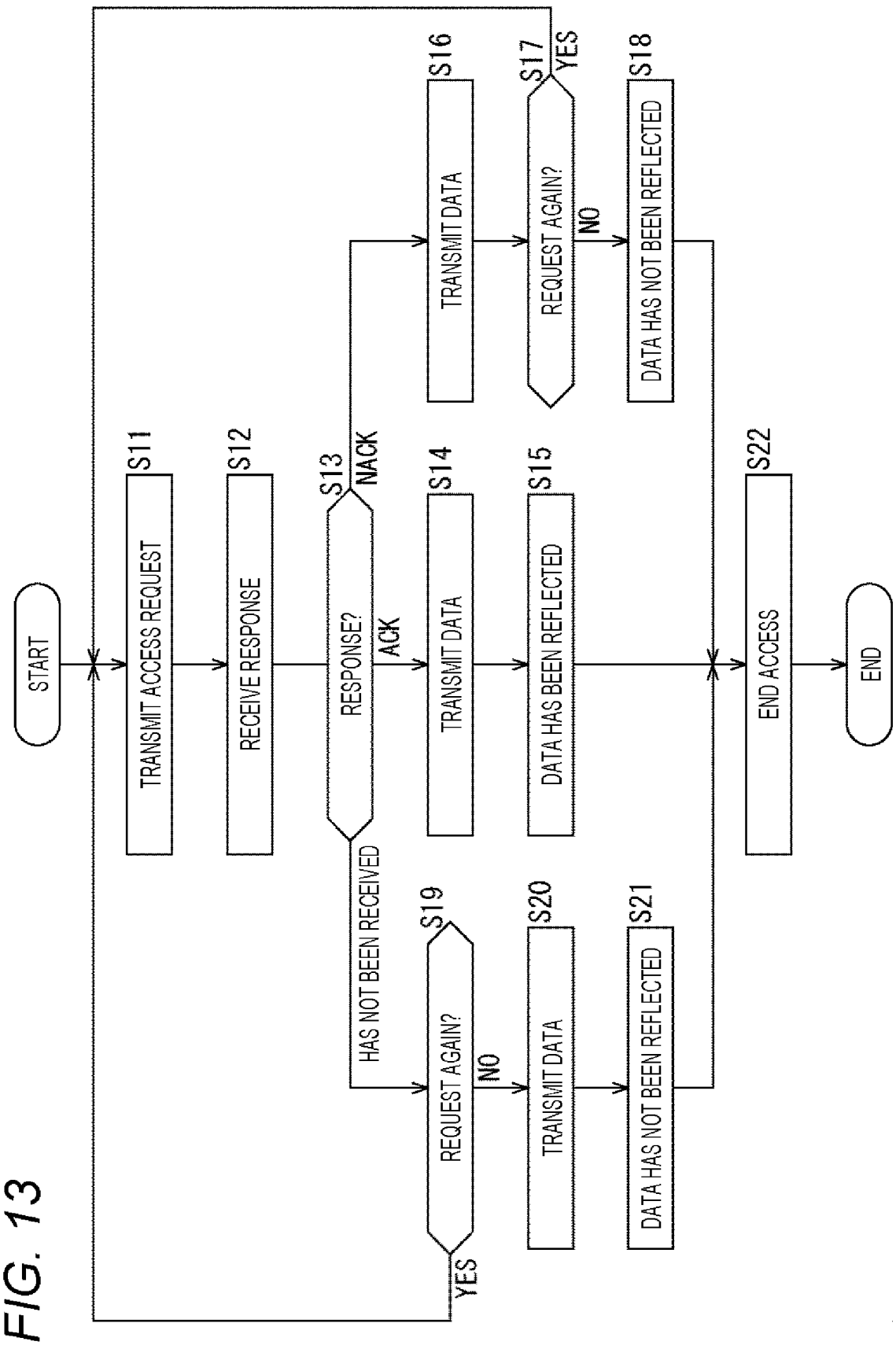
FIG. 13 is a flowchart illustrating a communication process of the I3C master that performs communication by the conventional communication method.

FIG. 13 is a flowchart illustrating the communication process (for example, the process example of FIG. 4 described above) of the I3C master 21 that performs communication by the conventional communication method.

In step S11, the I3C master 21 transmits an access request to the I3C slave 22.

In step S12, the I3C master 21 stands by for the response of the I3C slave 22 to the access request in step S11, and receives the response transmitted from the I3C slave 22.

In step S13, the I3C master 21 determines whether the response received in step S12 is an ACK response or a NACK response. Moreover, in step S13, in a case where neither the ACK response nor the NACK response have been received within a predetermined period, the I3C master 21 can skip step S12 and determine that the response of the I3C slave 22 to the access request has not been received.

In step S13, in a case where the I3C master 21 determines that the response of the I3C slave 22 to the access request is an ACK response, the processing proceeds to step S14.

In step S14, the I3C master 21 transmits write data to the I3C slave 22. Then, in step S15, the I3C master 21 processes the write data requested to be written in the access request of step S11 as having been reflected.

In contrast, in step S13, in a case where the I3C master 21 determines that the response of the I3C slave 22 to the access request is a NACK response, the processing proceeds to step S16.

In step S16, the I3C master 21 transmits the write data to the I3C slave 22. Then, in step S17, the I3C master 21 determines whether or not to retransmit the access request in response to the fact that there is a NACK response from the I3C slave 22.

In step S17, in a case where the I3C master 21 determines to retransmit the access request, the processing returns to step S11, and similar processes are repeatedly performed thereafter.

In contrast, in step S17, in a case where the I3C master 21 determines not to retransmit the access request, the processing proceeds to step S18, and the I3C master 21 processes the write data requested to be written in the access request of step S11 as not being reflected.

In contrast, in step S13, in a case where the I3C master 21 determines that the response of the I3C slave 22 to the access request has not been received (there is no response within the predetermined period), the processing proceeds to step S19.

In step S19, the I3C master 21 determines whether or not to retransmit the access request in response to the fact that the response of the I3C slave 22 has not been received.

In step S19, in a case where the I3C master 21 determines to retransmit the access request, the processing returns to step S11, and similar processes are repeatedly performed thereafter.

In contrast, in step S19, in a case where the I3C master 21 determines not to retransmit the access request, the processing proceeds to step S20. In step S20, the I3C master 21 transmits the write data to the I3C slave 22. In step S21, the I3C master 21 processes the write data requested to be written in the access request in step S11 as not being reflected.

After the process of step S15, step S18, or step S21, the processing proceeds to step S22, and the I3C master 21 ends the access to the I3C slave 22 started by the access request in step S11. Thereafter, at the timing when the next access request is made, processes similar to those described above are repeatedly performed as appropriate.

Figure 14:
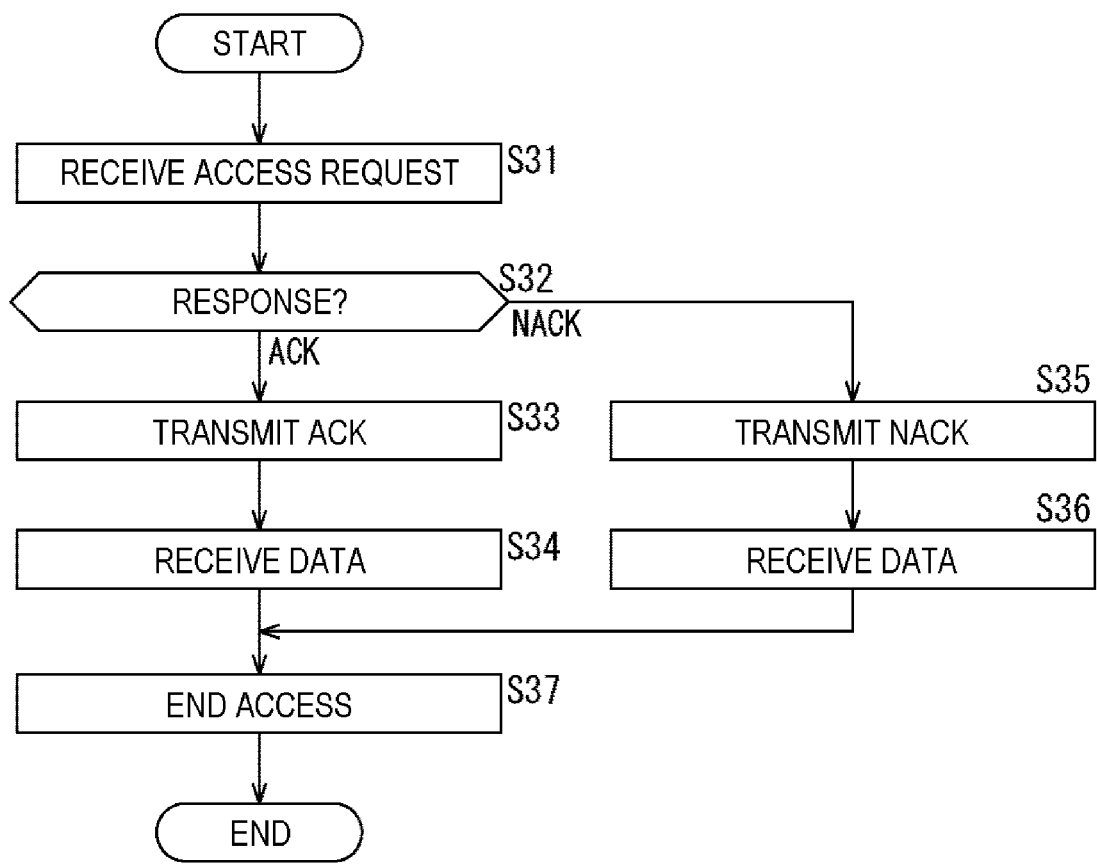
FIG. 14 is a flowchart illustrating a communication process of the I3C slave that performs communication by the conventional communication method.

FIG. 14 is a flowchart illustrating a communication process (for example, the processing example of FIG. 4 described above) of the I3C slave 22 that performs communication by the conventional communication method.

In step S31, the I3C slave 22 receives the access request transmitted from the I3C master 21 in step S11 of FIG. 13.

In step S32, the I3C slave 22 determines whether the response to the access request received in step S31 is an ACK response or a NACK response.

In step S32, in a case where the I3C slave 22 determines that the response to the access request is an ACK response, the processing proceeds to step S33.

In step S33, the I3C slave 22 makes an ACK response to the access request. Then, in step S34, the I3C slave 22 receives the write data transmitted from the I3C master 21 in step S14 of FIG. 13.

In contrast, in step S32, in a case where the I3C slave 22 determines that the response to the access request is a NACK response, the processing proceeds to step S35.

In step S35, the I3C slave 22 makes a NACK response to the access request. Then, in step S36, the I3C slave 22 receives the write data transmitted from the I3C master 21 in step S16 of FIG. 13. Here, the I3C slave 22 starts the process of writing the write data in the case of receiving the write data for the first time, and discards the write data in the case of receiving the write data for the second and subsequent times (during write processing or completion of writing).

After the process of step S34 or S36, the processing proceeds to step S37, and the I3C slave 22 ends the access from the I3C master 21 started by receiving the access request in step S31. Thereafter, when there is a next access request from the I3C master 21, processes similar to those described above are repeatedly performed.

Figure 15:
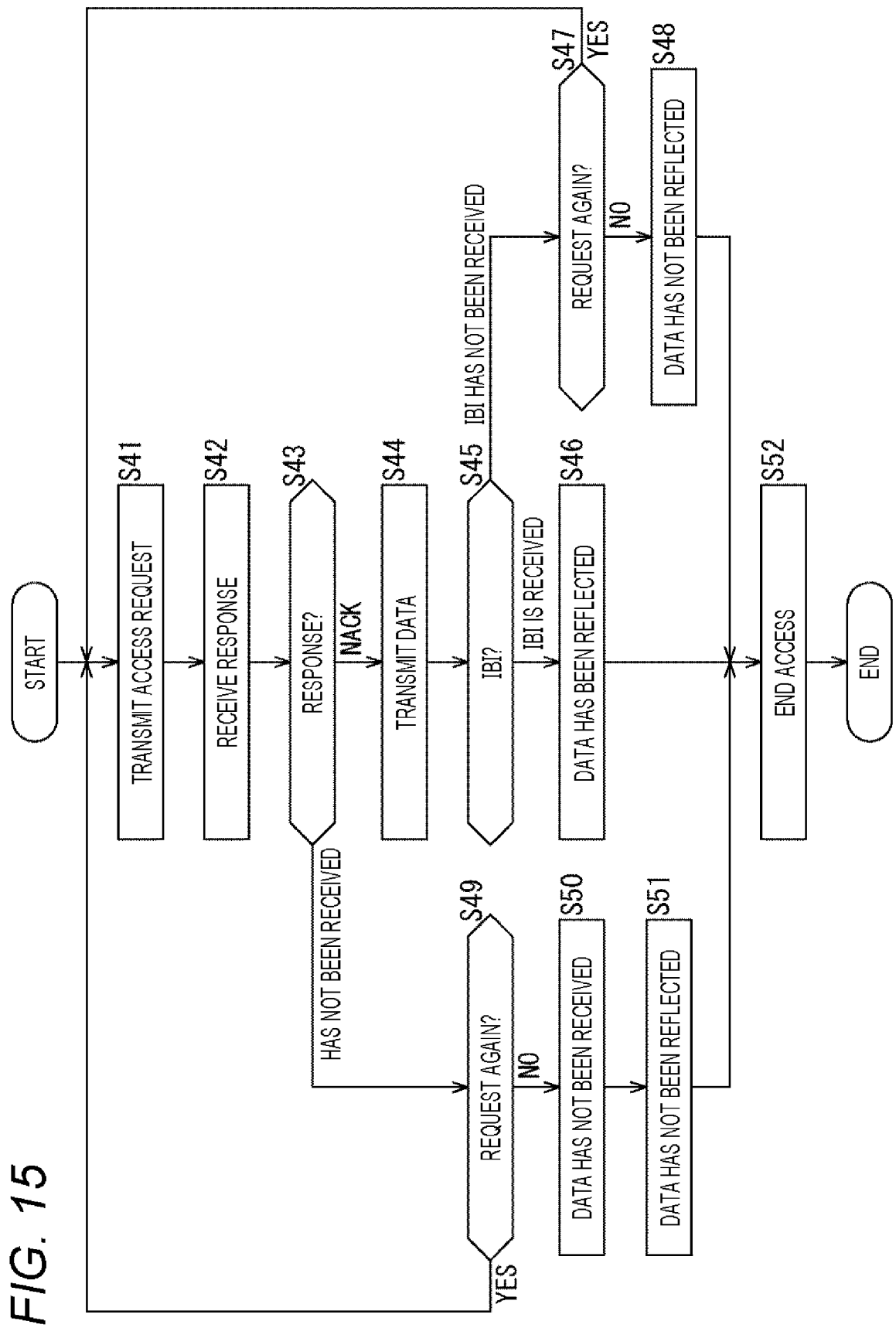
FIG. 15 is a flowchart illustrating a first communication process of the I3C master that performs communication by the communication method to which the present technology is applied.

FIG. 15 is a flowchart illustrating a first communication process (for example, the process example of FIG. 5 described above) of the I3C master 21 that performs communication by the communication method to which the present technology is applied.

Figure 17:
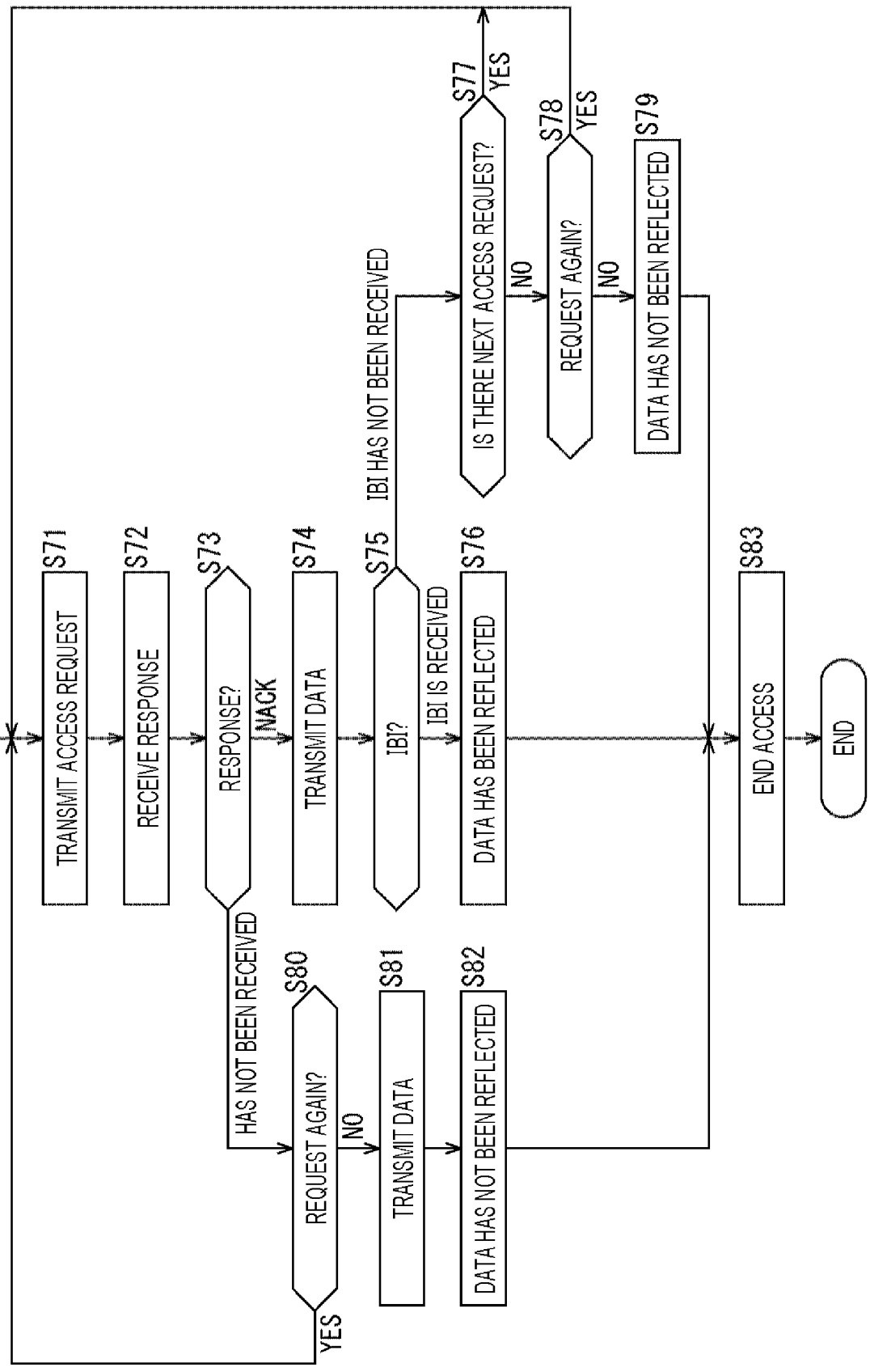
FIG. 17 is a flowchart illustrating a second communication process of the I3C master that performs communication by the communication method to which the present technology is applied.

In steps S41 and 42, processes similar to those in steps S11 and S12 in FIG. 17 are performed, and the I3C master 21 transmits an access request to the I3C slave 22 and receives a response transmitted from the I3C slave 22. Then, in step S43, the I3C master 21 determines whether a NACK response has been received in step S42 or a NACK response has not been received since a NACK response cannot be received within a predetermined period. Here, in a case where the mode for transferring a write completion status by IBI is set to be enabled, an ACK response is not transmitted from the I3C slave 22 in response to the access request.

In step S43, in a case where the I3C master 21 determines that the response of the I3C slave 22 to the access request is a NACK response, the processing proceeds to step S44. In step S44, the I3C master 21 transmits write data to the I3C slave 22.

In step S45, the I3C master 21 stands by for an IBI request from the I3C slave 22, and determines whether the IBI request has been received or the IBI request has not been received since the IBI request cannot be received within a predetermined period.

In a case where it is determined in step S45 that the I3C master 21 has received the IBI request, the processing proceeds to step S46.

In step S46, the I3C master 21 receives a write completion status transmitted from the I3C slave 22 by IBI in response to the access request in step S41. Then, the I3C master 21 processes the write data requested to be written in the access request of step S41 as having been reflected.

In contrast, in step S45, in a case where the I3C master 21 determines that the IBI request has not been received (that is, in a case where the IBI reception waiting time has timed out), the processing proceeds to step S47. In this case, in steps S47 and S48, processes similar to those in steps S17 and S18 in FIG. 13 are performed, and the access request is retransmitted.

In contrast, in step S43, in a case where the I3C master 21 determines that the response of the I3C slave 22 to the access request has not been received (there is no response within the predetermined period), the processing proceeds to step S49. In this case, in steps S49 to S51, processes similar to those in steps S19 to S21 in FIG. 13 are performed.

After the process of step S46, step S48, or step S51, the processing proceeds to step S52, and the I3C master 21 ends the access to the I3C slave 22 started by the access request in step S41. Thereafter, at the timing when the next access request is made, processes similar to those described above are repeatedly performed as appropriate.

Figure 16:
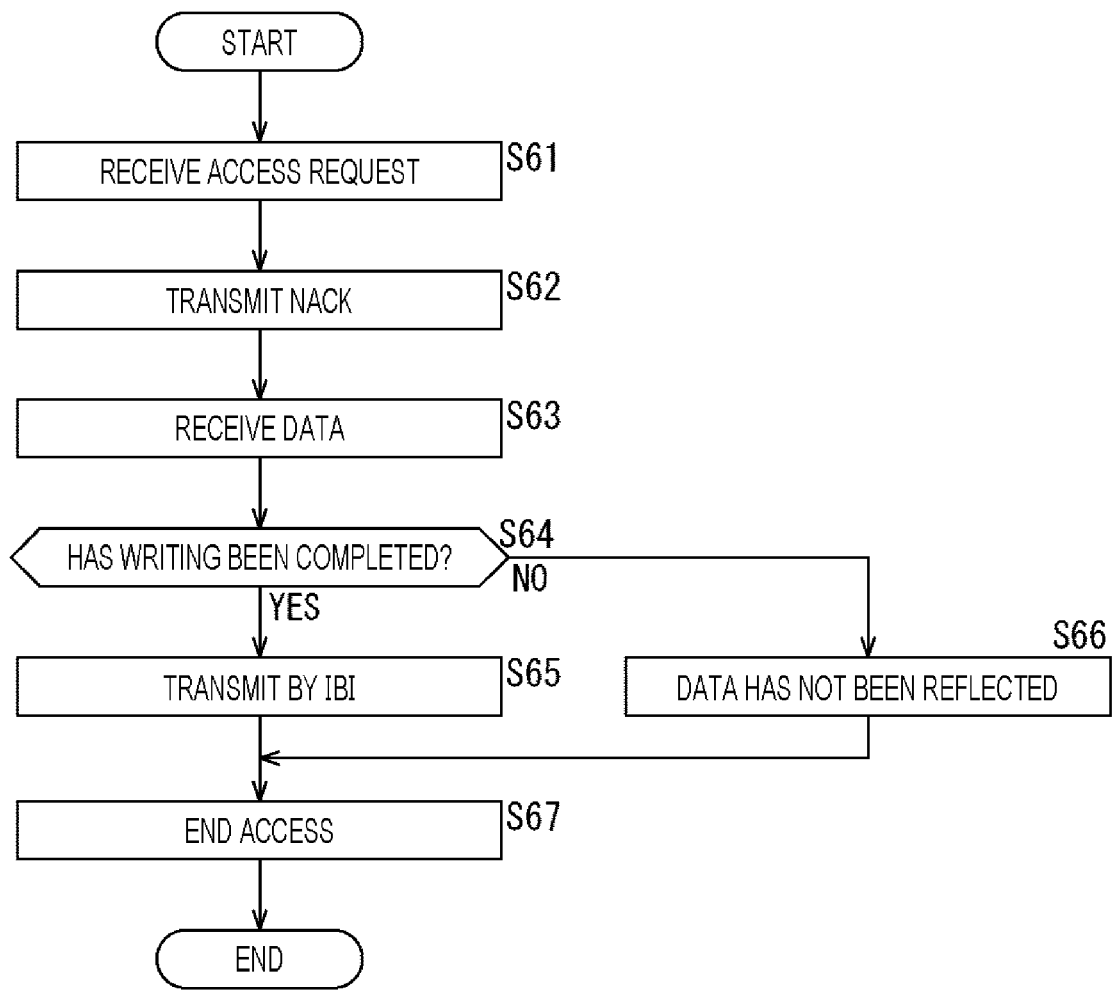
FIG. 16 is a flowchart illustrating a first communication process of the I3C slave that performs communication by the communication method to which the present technology is applied.

FIG. 16 is a flowchart illustrating a first communication process (for example, the process example of FIG. 5 described above) of the I3C slave 22 that performs communication by the communication method to which the present technology is applied.

In step S61, the I3C slave 22 receives the access request transmitted from the I3C master 21 in step S31 of FIG. 14.

In step S62, the I3C slave 22 makes a NACK response to the access request. Here, in a case where the mode for transferring the write completion status by IBI is set to be enabled, the I3C slave 22 does not transmit an ACK response in response to the access request.

In step S63, the I3C slave 22 receives the write data transmitted from the I3C master 21 in step S44 of FIG. 15.

In step S64, the I3C slave 22 determines whether or not writing of the write data received in step S63 is completed. For example, in a case where writing of the write data to the sensor 23 (for example, reflection of the setting value) is completed and the write completion status is acquired, the I3C slave 22 determines that writing of the write data is completed. In contrast, in a case where the write completion status is not acquired from the sensor 23, the I3C slave 22 determines that writing of the write data is not completed.

In step S64, in a case where the I3C slave 22 determines that writing of the write data is completed, the processing proceeds to step S65.

In step S65, the I3C slave 22 makes an IBI request to the I3C master 21, and transmits the write completion status by IBI.

In contrast, in step S64, in a case where the I3C slave 22 determines that writing of the write data is not completed, the processing proceeds to step S66, and the write data is not reflected since writing of the write data cannot be completed.

After the process of step S65 or S66, the processing proceeds to step S67, and the I3C slave 22 ends the access from the I3C master 21 started by receiving the access request in step S61. Thereafter, when there is a next access request from the I3C master 21, processes similar to those described above are repeatedly performed.

FIG. 17 is a flowchart illustrating a second communication process (for example, the process example of FIG. 6 described above) of the I3C master 21 that performs communication by the communication method to which the present technology is applied.

For example, the process of the flowchart illustrated in FIG. 17 is different from the process in FIG. 15 in that the I3C master 21 stands by for an IBI request from the I3C slave 22 in step S75, determines that the IBI request has not been received since the IBI request cannot be received within a predetermined period, and then determines whether or not to make the next access in step S77. That is, the other processes in the flowchart illustrated in FIG. 17 are performed similarly to the processes in the flowchart of FIG. 15.

Then, in a case where the I3C master 21 determines to make the next access in step S77, the processing returns to step S71 and an access request is transmitted, and thereafter similar processes are repeatedly performed.

Figure 18:
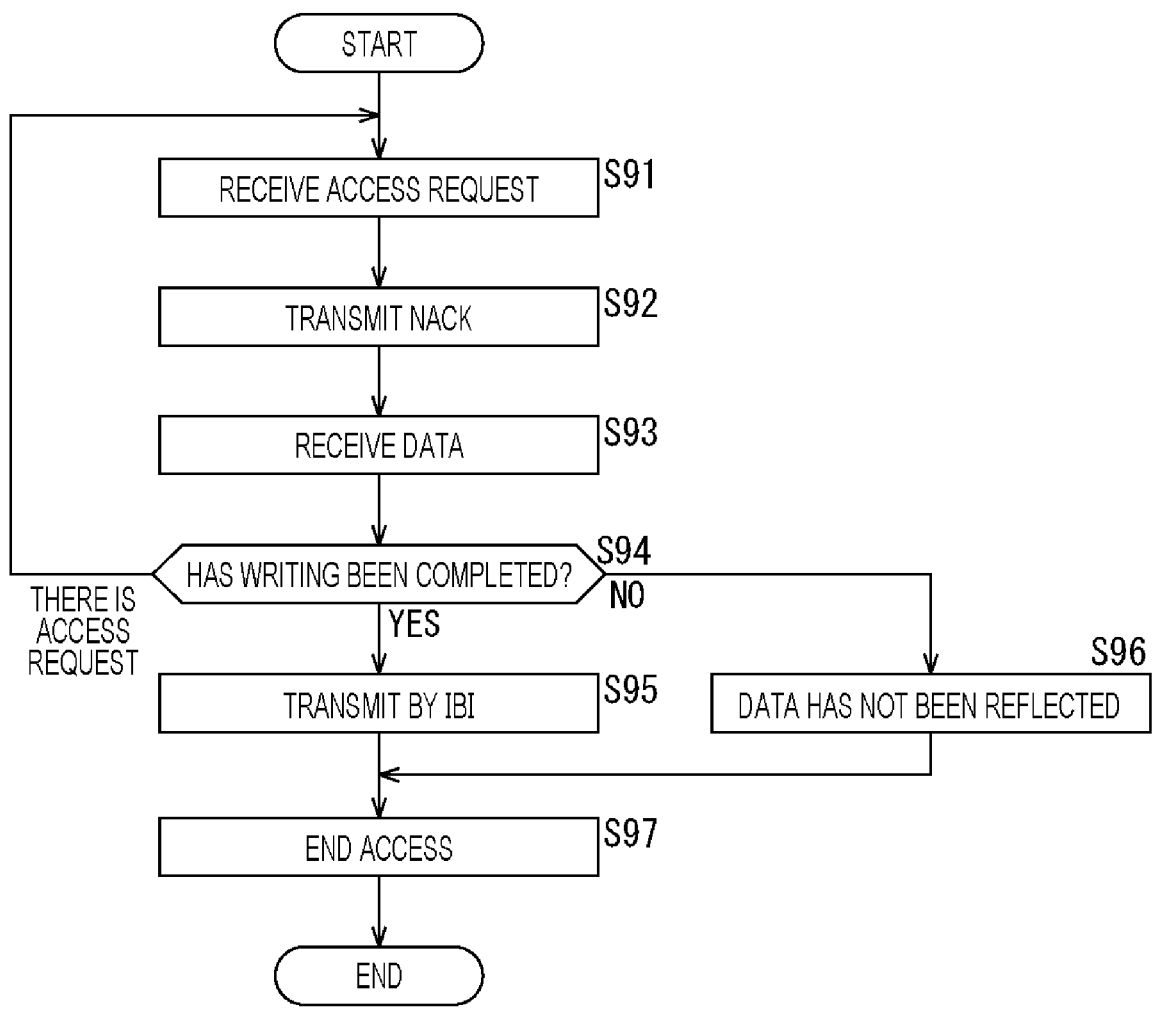
FIG. 18 is a flowchart illustrating a second communication process of the I3C slave that performs communication by the communication method to which the present technology is applied.

FIG. 18 is a flowchart illustrating a second communication process (for example, the process example of FIG. 6 described above) of the I3C slave 22 that performs communication by the communication method to which the present technology is applied.

For example, the process of the flowchart illustrated in FIG. 18 is different from that in step S64 of FIG. 16 in that the I3C slave 22 determines whether or not the next access has been made in addition to determining whether or not writing of write data is completed in step S94. That is, the other processes in the flowchart illustrated in FIG. 18 are performed similarly to the processes in the flowchart of FIG. 16.

Then, in a case where the I3C slave 22 determines that there is the next access in step S64, the processing returns to step S91 and the I3C slave 22 receives the access request, and thereafter, similar processes are repeatedly performed.

<Configuration Examples of Application Processor and Sensor Device>

Figure 19:
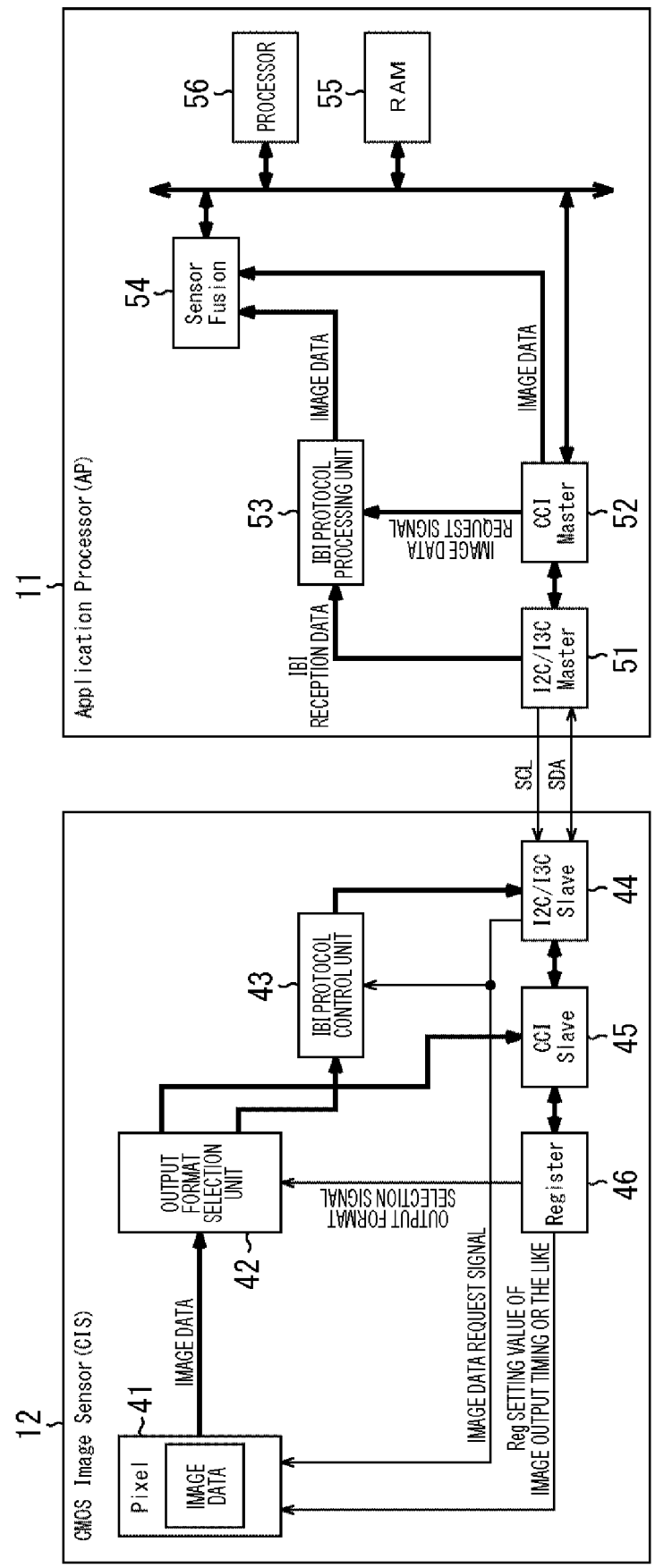
FIG. 19 is a block diagram illustrating configuration examples of an application processor and a sensor device.

FIG. 19 is a block diagram illustrating configuration examples of an application processor 11 and a sensor device 12.

As illustrated in FIG. 19, the sensor device 12 includes a pixel 41, an output format selection unit 42, an IBI protocol control unit 43, an I2C/I3C slave 44, a CCI slave 45, and a register 46. The application processor 11 includes an I2C/I3C master 51, a CCI master 52, an IBI protocol processing unit 53, a sensor fusion unit 54, a RAM 55, and a processor 56.

Here, the I2C/I3C slave 44 corresponds to the I3C slave 22 in FIGS. 1A and 1B, and the I2C/I3C master 51 corresponds to the I3C master 21 in FIGS. 1A and 1B. Furthermore, in the configuration example illustrated in FIG. 19, the sensor device 12 is a CMOS image sensor, and the sensor 23 in FIGS. 1A and 1B have a configuration including the pixel 41.

For example, the I2C/I3C master 51 of the application processor 11 makes an image data request access to the I2C/I3C slave 44 of the sensor device 12 via the I3C bus. The sensor device 12 transmits a NACK response to the image data request access from the application processor 11 and asserts an image data request signal.

Inside the sensor device 12, the pixel 41 outputs image data to the output format selection unit 42 since the image data request signal is asserted. The output format selection unit 42 controls the output destination of the image data according to the output format selection signal read from the register 46.

For example, similarly to the conventional communication method, in a case where image data is transferred in response to an access request from the application processor 11, the output format selection unit 42 outputs the image data to the CCI slave 45.

In contrast, in a case where an IBI protocol is used, the output format selection unit 42 outputs the image data to the IBI protocol processing unit 53. The IBI protocol processing unit 53 generates IBI transfer data and issues an IBI request to the application processor 11 via the I3C bus.

Then, in the application processor 11, the I2C/I3C master 51 that has received the IBI request outputs IBI reception data to the IBI protocol processing unit 53. The IBI protocol processing unit 53 analyzes the IBI reception data, specifies which image data request access the data is for, and outputs the image data to the sensor fusion unit 54.

Figure 20:
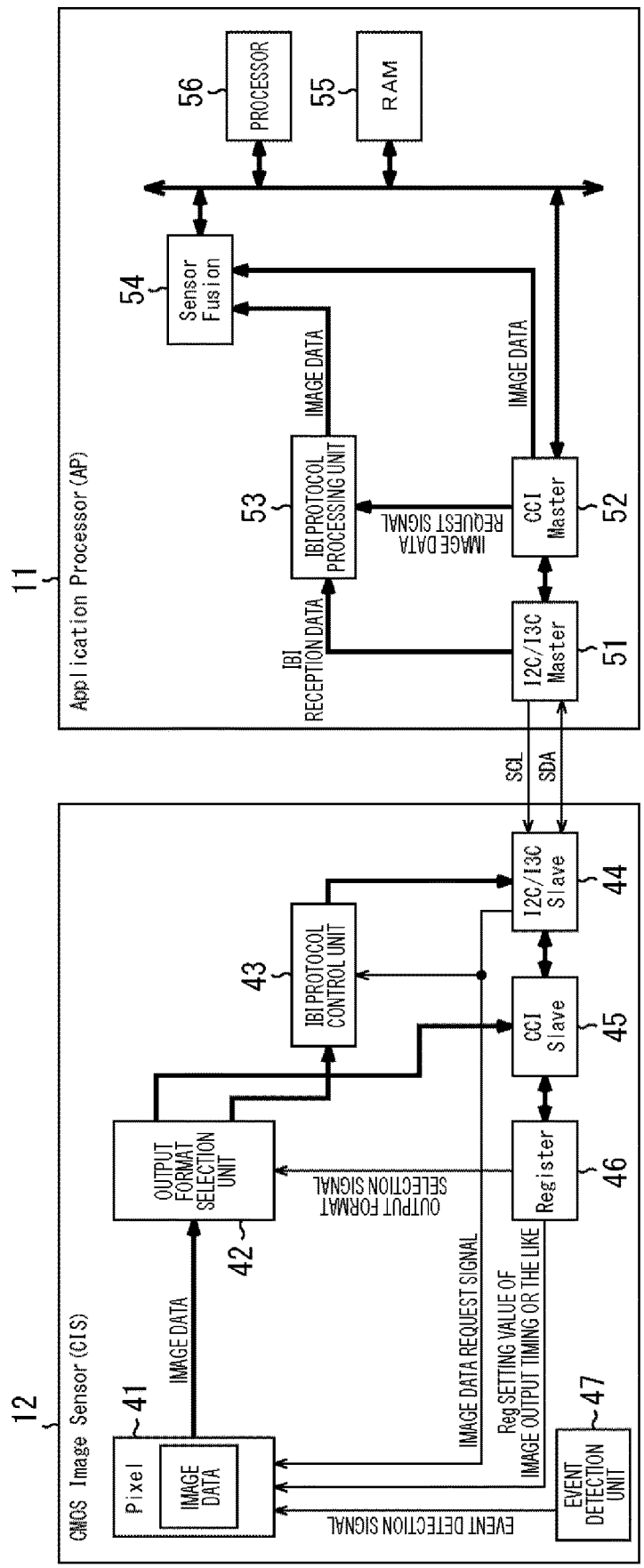
FIG. 20 is a block diagram illustrating other configuration examples of the application processor and the sensor device.

FIG. 20 illustrates a configuration example of the application processor 11 and the sensor device 12 that perform communication on Always On.

The application processor 11 and the sensor device 12 illustrated in FIG. 20 are different in configuration from the application processor 11 and the sensor device 12 in FIG. 19 in that the sensor device 12 includes an event detection unit 47, and are configured similarly to the application processor 11 and the sensor device 12 in FIG. 19 except the above configuration.

For example, in AlwaysOn, the event detection unit 47 detects an event (for example, detects a person) and transfers image data according to the IBI protocol. Therefore, the operation is caused by the I3C slave 22. In contrast, the communication method to which the present technology is applied is a technology different from AlwaysOn in that the operation is caused by the I3C master 21 because image data is transferred according to the IBI protocol in response to an access request from the I3C master 21.

<Configuration Example of Computer>

Figure 21:
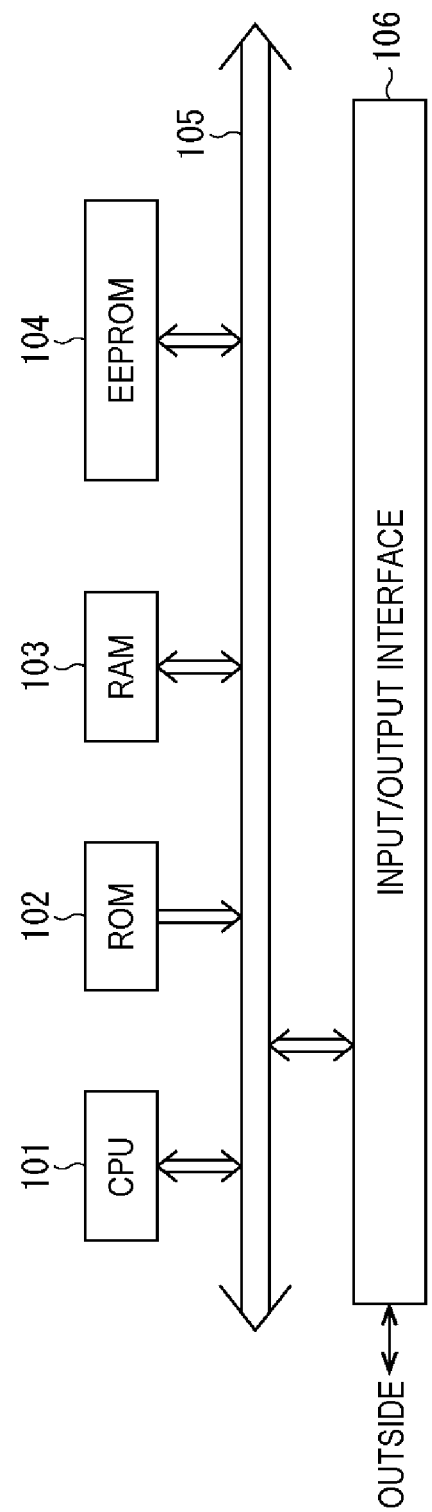
FIG. 21 is a block diagram illustrating a configuration example of an embodiment of a computer to which the present technology is applied.

FIG. 21 is a block diagram illustrating a configuration example of the hardware of a computer that executes the series of processes described above according to a program.

In the computer, a central processing unit (CPU) 101, a read only memory (ROM) 102, a random access memory (RAM) 103, and an electronically erasable and programmable read only memory (EEPROM) 104 are mutually connected by a bus 105. Moreover, an input/output interface 106 is connected to the bus 105, and the input/output interface 106 is connected to the outside.

In the computer configured as described above, for example, the CPU 101 loads the program stored in the ROM 102 and the EEPROM 104 into the RAM 103 via the bus 105 and executes the program, and thus the series of processes described above are performed. Furthermore, the program executed by the computer (CPU 101) can be written in the ROM 102 in advance, installed in the EEPROM 104 from the outside via the input/output interface 106, or updated.

Here, in the present Description, the processes performed by the computer according to the program do not necessarily have to be performed in time series in the order described as the flowcharts. That is, the processes performed by the computer according to the program also include processes executed in parallel or individually (for example, parallel processing or processing by an object).

Furthermore, the program may be processed by one computer (processor) or may be subjected to distributed processing by a plurality of computers. Moreover, the program may be transferred to a remote computer and executed.

Moreover, in the present Description, a system means a set of a plurality of constituents (apparatuses, modules (components), or the like), and it does not matter whether or not all the constituents are in the same case. Therefore, each of a plurality of apparatuses housed in separate cases and connected via a network, and one apparatus in which a plurality of modules is housed in one case are a system.

Furthermore, for example, a configuration described as one apparatus (or processing unit) may be divided and configured as a plurality of apparatuses (or processing units). Conversely, the configurations described as a plurality of apparatuses (or processing units) hereinbefore may be collectively configured as one apparatus (or processing unit). Furthermore, it goes without saying that a configuration other than those described above may be added to the configuration of each apparatus (or each processing unit). Moreover, if the configuration and operation of the system as a whole are substantially the same, part of the configuration of a certain apparatus (or processing unit) may be included in the configuration of another apparatus (or another processing unit).

Furthermore, for example, the present technology can adopt a configuration of cloud computing in which one function is shared and processed jointly by a plurality of apparatuses via a network.

Moreover, for example, the program described above can be executed in an arbitrary apparatus. In that case, it is sufficient that the apparatus has a necessary function (functional block or the like) and can obtain necessary information.

Furthermore, for example, each step described in the above-described flowcharts can be executed by one apparatus, or can be shared and executed by a plurality of apparatuses. Moreover, in a case where a plurality of processes is included in one step, the plurality of processes included in the one step can be shared and executed by a plurality of apparatuses in addition to being executed by one apparatus. In other words, a plurality of processes included in one step can also be executed as processes of a plurality of steps. Conversely, processes described as a plurality of steps can be collectively executed as one step.

Note that in the program executed by the computer, processes of steps that describe the program may be executed in time series in the order described in the present Description, or the processes may be executed in parallel, or at necessary timing, such as when a call is made. That is, as long as there is no contradiction, the processes of respective steps may be executed in an order different from the above-described order. Moreover, the processes of steps that describe this program may be executed in parallel with the processes of another program, or may be executed in combination with the processes of another program.

Note that each of the plurality of the present technologies described in the present Description can be implemented independently as long as there is no contradiction. It is needless to say that a plurality of arbitrary present technologies can be implemented in combination. For example, part or entirety of the present technology described in any of the embodiments can be implemented in combination with part or entirety of the present technology described in another embodiment. Furthermore, part or entirety of an arbitrary present technology described above can be implemented in combination with another technology not described above.

<Examples of Configuration Combinations>

Note that the present technology can also be configured as follows.

(1)

A communication apparatus including:

an access request transmission unit that transmits an access request which requests writing of data to another communication apparatus via a bus; and a process standby determination unit that determines whether or not a write completion status indicating that the writing of the data has been completed in response to the access request is transmitted from the another communication apparatus by an interrupt request in a case where a response of the another communication apparatus to the access request is a NACK response, and stands by for a process until the write completion status is transmitted by the interrupt request.

(2)

The communication apparatus according to the (1), in which the access request transmission unit transmits an access request to a second another communication apparatus via the bus in a predetermined period from reception of a NACK response in response to an access request to a first another communication apparatus to transmission of the write completion status by an interrupt request from the first another communication apparatus.

(3)

The communication apparatus according to the (1) or (2), in which the access request transmission unit accesses a register of the another communication apparatus and sets a mode for transferring the write completion status by an interrupt request to be enabled or disabled.

(4)

The communication apparatus according to any one of the (1) to (3), in which the access request transmission unit retransmits the access request when a reception waiting time for standing by for a process until the write completion status is transmitted by an interrupt request from the another communication device in response to the access request has timed out.

(5)

The communication apparatus according to any one of the (1) to (4), further including a data reception unit that receives the write completion status transmitted by an interrupt request from the another communication apparatus.

(6)

The communication apparatus according to the (5), in which the data reception unit suspends a process standby state in a case where a suspension flag giving an instruction on suspension of the process standby state is received by an interrupt request from the another communication apparatus.

(7)

A communication method including:

by a communication apparatus, transmitting an access request which requests writing of data to another communication apparatus via a bus; and determining whether or not a write completion status indicating that the writing of the data has been completed in response to the access request is transmitted from the another communication apparatus by an interrupt request in a case where a response of the another communication apparatus to the access request is a NACK response, and standing by for a process until the write completion status is transmitted by the interrupt request.

(8)

A program causing a computer of a communication apparatus to execute a communication process including:

transmitting an access request which requests writing of data to another communication apparatus via a bus; and determining whether or not a write completion status indicating that the writing of the data has been completed in response to the access request is transmitted from the another communication apparatus by an interrupt request in a case where a response of the another communication apparatus to the access request is a NACK response, and standing by for a process until the write completion status is transmitted by the interrupt request.

(9)

A communication apparatus including:

an access request reception unit that receives an access request which requests writing of data, the access request being transmitted from another communication apparatus via a bus; and a transmission unit that transmits a NACK response to the another communication apparatus in a case where the writing of the data in response to the access request has not been completed, and transmits a write completion status indicating that the writing of the data has been completed by an interrupt request at a timing when the writing of the data in response to the access request has been completed.

(10)

A communication method including:

by a communication apparatus, receiving an access request which requests writing of data, the access request being transmitted from another communication apparatus via a bus; and transmitting a NACK response to the another communication apparatus in a case where the writing of the data in response to the access request has not been completed, and transmitting a write completion status indicating that the writing of the data has been completed by an interrupt request at a timing when the writing of the data in response to the access request has been completed.

(11)

A program causing a computer of a communication apparatus to execute a communication process including:

receiving an access request which requests writing of data, the access request being transmitted from another communication apparatus via a bus; and transmitting a NACK response to the another communication apparatus in a case where the writing of the data in response to the access request has not been completed, and transmitting a write completion status indicating that the writing of the data has been completed by an interrupt request at a timing when the writing of the data in response to the access request has been completed.

Note that the present embodiments are not limited to the above-described embodiments, and various modifications can be made without departing from the scope of the present disclosure. Furthermore, the effects described in the present Description are illustrations only and not limited, and may have other effects.

REFERENCE SIGNS LIST

11 Application processor
12 Sensor device
21 I3C master
22 I3C slave
23 Sensor

The invention claimed is:

1. A first communication apparatus, comprising:
an access request transmission unit configured to:
transmit an access request which requests writing of data to a second communication apparatus via a bus; and
a process standby determination unit configured to:
determine, based on a response of the second communication apparatus to the access request is a NACK response, whether a write completion status is transmitted from the second communication apparatus by an interrupt request, wherein the write completion status indicates that the writing of the data is completed in response to the access request; and
stand by for a process until the write completion status is transmitted by the interrupt request.

2. The first communication apparatus according to claim 1, wherein
the access request transmission unit is further configured to transmit an access request to a third communication apparatus via the bus in a specific period from reception of the NACK response in response to the access request to the second communication apparatus to the transmission of the write completion status by the interrupt request from the second communication apparatus.

3. The first communication apparatus according to claim 1, wherein
the access request transmission unit is further configured to:
access a register of the second communication apparatus; and
set a mode for transferring the write completion status by the interrupt request to be enabled or disabled.

4. The first communication apparatus according to claim 1, wherein
the access request transmission unit is further configured to retransmit the access request, based on a reception waiting time for stand by for the process until the write completion status is transmitted by the interrupt request from the second communication apparatus in response to the access request has timed out.

5. The first communication apparatus according to claim 1, further comprising
a data reception unit configured to receive the write completion status transmitted by the interrupt request from the second communication apparatus.

6. The first communication apparatus according to claim 5, wherein
the data reception unit is further configured to suspend a process standby state based on a suspension flag giving an instruction on suspension of the process standby state is received by the interrupt request from the second communication apparatus.

7. A communication method, comprising:
a first communication apparatus:
transmitting an access request which requests writing of data to a second communication apparatus via a bus;
determining, based on a response of the second communication apparatus to the access request is a NACK response, whether a write completion status is transmitted from the second communication apparatus by an interrupt request, wherein the write completion status indicates that the writing of the data is completed in response to the access request; and standing by for a process until the write completion status is transmitted by the interrupt request.

8. A non-transitory computer-readable medium having stored thereon, computer-executable instructions which, when executed by a computer, cause the computer to execute operations, the operations comprising:

transmitting an access request which requests writing of data to second communication apparatus via a bus;

determining, based on a response of the second communication apparatus to the access request is a NACK response, whether a write completion status is transmitted from the second communication apparatus by an interrupt request, wherein the write completion status indicates that the writing of the data is completed in response to the access request; and standing by for a process until the write completion status is transmitted by the interrupt request.

9. A first communication apparatus, comprising:

an access request reception unit is configured to receive an access request which requests writing of data, wherein the access request is transmitted from a second communication apparatus via a bus; and a transmission unit is configured to:

transmit NACK response to the second communication apparatus, based on the writing of the data in response to the access request is not completed; and transmit a write completion status, indicating that the writing of the data is completed, by an interrupt request at a timing when the writing of the data in response to the access request is completed.

10. A communication method, comprising:

by a first communication apparatus:

receiving an access request which requests writing of data, wherein the access request is transmitted from a second communication apparatus via a bus;

transmitting a NACK response to the second communication apparatus, based on the writing of the data in response to the access request is not completed; and transmit a write completion status, indicating that the writing of the data is completed, by an interrupt request at a timing when the writing of the data in response to the access request is completed.

11. A non-transitory computer-readable medium having stored thereon, computer-executable instructions which, when executed by a computer, cause the computer to execute operations, the operations comprising:

receiving an access request which requests writing of data, wherein the access request is transmitted from a second communication apparatus via a bus;

transmitting a NACK response to the second communication apparatus, based on the writing of the data in response to the access request is not completed; and transmitting a write completion status, indicating that the writing of the data is completed, by an interrupt request at a timing when the writing of the data in response to the access request is completed.

* * * * *